US009680640B2

United States Patent
Hughes et al.

(10) Patent No.: US 9,680,640 B2
(45) Date of Patent: *Jun. 13, 2017

(54) SECURE MULTI-PARTY COMMUNICATION WITH QUANTUM KEY DISTRIBUTION MANAGED BY TRUSTED AUTHORITY

(71) Applicant: Los Alamos National Security, LLC, Los Alamos, NM (US)

(72) Inventors: Richard John Hughes, Los Alamos, NM (US); Jane Elizabeth Nordholt, Los Alamos, NM (US); Charles Glen Peterson, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/589,261

(22) Filed: Jan. 5, 2015

(65) Prior Publication Data

US 2016/0013936 A1  Jan. 14, 2016

Related U.S. Application Data

(63) Continuation of application No. 13/912,010, filed on Jun. 6, 2013, now Pat. No. 8,929,554, which is a
(Continued)

(51) Int. Cl.
*H04L 9/08* (2006.01)
*H04L 29/06* (2006.01)
(Continued)

(52) U.S. Cl.
CPC ............ *H04L 9/0852* (2013.01); *H04L 9/083* (2013.01); *H04L 9/0883* (2013.01);
(Continued)

(58) Field of Classification Search
CPC ....... H04L 9/08; H04L 9/0819; H04L 9/0822; H04L 9/0823; H04L 9/083; H04L 9/0833;
(Continued)

(56) References Cited

U.S. PATENT DOCUMENTS

| 5,966,224 A | 10/1999 | Hughes et al. |
| 6,263,435 B1 * | 7/2001 | Dondeti ................ H04L 9/0822 380/259 |

(Continued)

FOREIGN PATENT DOCUMENTS

| CN | 101599826 A | 12/2009 |
| EP | 2081317 A2 | 7/2009 |

(Continued)

OTHER PUBLICATIONS

AFP-JIJI Press, "Japanese Develop System to Prevent Mobile Phone Tapping," JIJI Press, 4 pp., downloaded from the World Wide Web (document marked Sep. 2, 2010).
(Continued)

*Primary Examiner* — Jung Kim
*Assistant Examiner* — Adrian Stoica
(74) *Attorney, Agent, or Firm* — Wilmer Cutler Pickering Hale and Dorr LLP

(57) ABSTRACT

Techniques and tools for implementing protocols for secure multi-party communication after quantum key distribution ("QKD") are described herein. In example implementations, a trusted authority facilitates secure communication between multiple user devices. The trusted authority distributes different quantum keys by QKD under trust relationships with different users. The trusted authority determines combination keys using the quantum keys and makes the combination keys available for distribution (e.g., for non-secret distribution over a public channel). The combination keys facilitate secure communication between two user devices
(Continued)

even in the absence of QKD between the two user devices. With the protocols, benefits of QKD are extended to multi-party communication scenarios. In addition, the protocols can retain benefit of QKD even when a trusted authority is offline or a large group seeks to establish secure communication within the group.

10 Claims, 15 Drawing Sheets

Related U.S. Application Data continuation of application No. 12/895,367, filed on Sep. 30, 2010, now Pat. No. 8,483,394.

(60) Provisional application No. 61/355,117, filed on Jun. 15, 2010.

(51) Int. Cl.
*H04W 12/04* (2009.01)
*H04W 88/08* (2009.01)

(52) U.S. Cl.
CPC ........... *H04L 63/062* (2013.01); *H04W 12/04* (2013.01); *H04W 88/08* (2013.01)

(58) Field of Classification Search
CPC ... H04L 9/0836; H04L 9/0852; H04L 9/0855; H04L 9/0883; H04L 9/0891; H04L 63/06; H04L 63/062; H04L 63/064; H04L 63/065; H04L 63/08; H04L 63/0823; H04W 12/00; H04W 12/04
See application file for complete search history.

(56) References Cited

U.S. PATENT DOCUMENTS

| | | | |
|---|---|---|---|
| 6,748,083 B2 | 6/2004 | Hughes et al. | |
| 7,457,416 B1 | 11/2008 | Elliott | |
| 7,515,716 B1 | 4/2009 | Elliott | |
| 7,587,654 B2 | 9/2009 | Matsumoto | |
| 7,627,126 B1 | 12/2009 | Pikalo et al. | |
| 7,725,026 B2 | 5/2010 | Patel et al. | |
| 8,005,227 B1* | 8/2011 | Linnell | H04L 9/083 380/277 |
| 8,213,620 B1* | 7/2012 | Sussland | H04L 9/083 380/278 |
| 8,483,394 B2 | 7/2013 | Nordholt et al. | |
| 2001/0055389 A1 | 12/2001 | Hughes et al. | |
| 2002/0010857 A1 | 1/2002 | Karthik | |
| 2003/0002768 A1 | 1/2003 | Wood et al. | |
| 2003/0098355 A1 | 5/2003 | Johnson | |
| 2004/0017916 A1 | 1/2004 | Staddon et al. | |
| 2004/0128509 A1 | 7/2004 | Gehrmann | |
| 2005/0044356 A1 | 2/2005 | Srivastava et al. | |
| 2005/0125684 A1 | 6/2005 | Schmidt | |
| 2005/0141716 A1 | 6/2005 | Kumar et al. | |
| 2006/0168446 A1* | 7/2006 | Ahonen | H04L 9/0822 713/163 |
| 2006/0212936 A1 | 9/2006 | Berzanskis et al. | |
| 2006/0263096 A1 | 11/2006 | Dinu et al. | |
| 2007/0177735 A1 | 8/2007 | Mimih et al. | |
| 2007/0192598 A1 | 8/2007 | Troxel et al. | |
| 2007/0223698 A1 | 9/2007 | Tsurumaru | |
| 2007/0280689 A1 | 12/2007 | Boffi et al. | |
| 2008/0031456 A1 | 2/2008 | Harrison et al. | |
| 2008/0144823 A1 | 6/2008 | Abe et al. | |
| 2008/0152147 A1 | 6/2008 | Xia et al. | |
| 2009/0022322 A1 | 1/2009 | Trifonov | |
| 2009/0092252 A1 | 4/2009 | Noll et al. | |
| 2009/0150561 A1 | 6/2009 | Vig | |
| 2009/0160670 A1 | 6/2009 | Sipple | |
| 2009/0169015 A1 | 7/2009 | Watanabe | |
| 2009/0175450 A1 | 7/2009 | Brandt | |
| 2009/0175452 A1 | 7/2009 | Gelfond et al. | |
| 2009/0180615 A1 | 7/2009 | Trifonov | |
| 2009/0180616 A1 | 7/2009 | Brodsky et al. | |
| 2009/0180776 A1 | 7/2009 | Brodsky et al. | |
| 2009/0185689 A1 | 7/2009 | Beal | |
| 2009/0190759 A1 | 7/2009 | Peev et al. | |
| 2009/0202074 A1 | 8/2009 | Trifonov et al. | |
| 2009/0240913 A1 | 9/2009 | Obana et al. | |
| 2009/0257755 A1 | 10/2009 | Buelow | |
| 2009/0262942 A1* | 10/2009 | Maeda | H04L 9/0855 380/278 |
| 2009/0316910 A1* | 12/2009 | Maeda | H04L 9/0855 380/279 |
| 2010/0226659 A1 | 9/2010 | Nishioka et al. | |
| 2010/0257434 A1 | 10/2010 | Harrison et al. | |
| 2011/0208971 A1 | 8/2011 | Bhattacharya et al. | |

FOREIGN PATENT DOCUMENTS

| | | |
|---|---|---|
| JP | H10-322328 A | 12/1998 |
| JP | 2003-348065 A | 12/2003 |
| JP | 2009-065299 A | 3/2009 |
| JP | 2009-265159 A | 11/2009 |
| KR | 10-0892763 B1 | 4/2009 |
| WO | WO-2007/123869 A2 | 11/2007 |
| WO | WO-2008/015758 A1 | 2/2008 |
| WO | WO-2009/093034 A2 | 7/2009 |
| WO | WO-2009/093036 A2 | 7/2009 |
| WO | WO-2009/093037 A1 | 7/2009 |
| WO | WO-2009/141586 A1 | 11/2009 |
| WO | WO-2009/141587 A1 | 11/2009 |
| WO | WO-2009/145392 A1 | 12/2009 |
| WO | WO-2012/044852 A1 | 4/2012 |
| WO | WO-2012/044855 A2 | 4/2012 |
| WO | WO-2013/048671 A1 | 4/2013 |
| WO | WO-2013/048672 A1 | 4/2013 |
| WO | WO-2013/048674 A1 | 4/2013 |

OTHER PUBLICATIONS

Arda, "A Quantum Information Science and Technology Roadmap—Part 2: Quantum Cryptography—Report of the Quantum Cryptography Technology Experts Panel," 100 pp. (Jul. 19, 2004).
Barrie, "Defeating Cyber-Attacks with Quantum Cryptography," FoxNews.com, 2 pp. (Mar. 2013).
Becker, et al., "Merkle Signature Schemes, Merkle Trees and Their Cryptanalysis," 28 pp. (2008).
Buttler, et al., "Free-space Quantum Key Distribution," Phys. Rev. A, vol. 57, No. 4, pp. 2379-2382 (Apr. 1998).
Buttler, et al., "Practical Free-space Quantum Key Distribution over 1 km," Physical Reviews Letters, vol. 81, No. 15, pp. 3283-3286 (Oct. 1998).
Chapuran, et al., "Optical Networking for Quantum Key Distribution and Quantum Communications," New Journal of Physics, vol. 11, 19 pp. (Oct. 2009).
Cleve, R. et al., "How to Share a Quantum Secret," Physical Review Letters, vol. 83, No. 3, pp. 648-651 (Jul. 19, 1999).
Damgard, et al., "Secure Identification and QKD in the Bounded-Quantum-Storage Model," Proc. 27th Annual International Cryptology Conference on Advances in Cryptology, pp. 342-359 (Aug. 2007).
Dianati, M., et al., "Architecture and protocols of the future European quantum key distribution network," Security and Communication Networks, vol. 1, pp. 57-74 (2008).
Duligall, et al., "Low Cost and Compact Quantum Key Distribution," New Journal of Physics, vol. 8, 16 pp. (Oct. 2006).
Federal Information Processing Standard Publication 197, "The Advanced Encryption Standard (AES)," 51 pp. (Nov. 2001).
Federal Information Processing Standard Publication 198, "The Keyed-Hash Message Authentication Code (HMAC)," 20 pp. (Mar. 2002).
Graham-Rowe, "My Name is Bob and I Make E-shopping a Cinch," New Scientist, pp. 30-31 (Nov. 2007).

(56) References Cited

OTHER PUBLICATIONS

Greenemeier, "Quantum Cryptography Comes to Smart Phones," Scientific American, 1 p. (Feb. 2012).
Harrington, et al., "Enhancing Practical Security of Quantum Key Distribution with a Few Decoy States," 4 pp. (Mar. 2005).
Hillery et al., "Quantum Secret Sharing," Physical Review A, vol. 59, No. 3, pp. 1829-1834 (Mar. 1999).
Hughes, et al, "Secure Communications Using Quantum Cryptography," Proc. SPIE Photonic Quantum Computing, vol. 3076, pp. 2-11 (Jul. 1997).
Hughes, et al., "Comment on 'Quantum Key Distribution with 1.25 Gbps Clock Synchronization' by J. C. Bienfang et al., quant-ph/0405097," 4 pp. (Jul. 2004).
Hughes, et al., "Free-space Quantum Key Distribution in Daylight," Journal of Modern Optics, vol. 47, No. 2-3, pp. 549-562 (Feb. 2000).
Hughes, et al., "Network-Centric Quantum Communications with Application to Critical Infrastructure Protection," LA-UR-13-22718 (version 2), 7 pp. (May 2013).
Hughes, et al., "Practical Free-Space Quantum Cryptography," 17 pp. (1998).
Hughes, et al., "Practical Free-space Quantum Key Distribution over 10 km in Daylight and at Night," New Journal of Physics, vol. 4, pp. 43.1-43.14 (Jul. 2002).
Hughes, et al., "Practical Quantum Cryptography for Secure Free-space Communications," 12 pp. (May 1999).
Hughes, et al., "Practical Quantum Key Distribution over a 48-km Optical Fiber Network," LA-UR-99-1593, 13 pp. (1999).
Hughes, et al., "Quantum Cryptography over Underground Optical Fibers," Advances in Cryptology, 16 pp. (Jul. 1996).
Hughes, et al., "Quantum Key Distribution," Los Alamos National Laboratory Physics Division, pp. 193-196 (Apr. 2004).
ID Quantique SA, "CLA VIS2 Quantum Key Distribution for R&D Applications," 2 pp. (downloaded from the World Wide Web on Sep. 9, 2011).
ID Quantique SA, "Redefining Precision CLA VIS2: The Most Versatile Quantum Key Distribution Research Platform," 4 pp. (document marked Jan. 2010).
ID Quantique SA, "Redefining Security Cerberis the Best of Classical and Quantum Worlds: Layer 2 Link Encryption with Quantum Key Distribution," 2 pp. (document marked Jan. 2010).
ID Quantique SA, "Separation of Duties: Dedicated vs Integrated Encryption Appliances," White Paper, Version 1.0, 8 pp. (Feb. 2011).
International Preliminary Report on Patentability dated Apr. 2, 2013, from International Patent Application No. PCT/US2011/054070, 5 pp.
International Search Report dated Mar. 21, 2012, from International Application No. PCT/US2011/054070, 3 pp.
Japanese Office Action issued by the Japan Patent Office for Application No. 2013-531881 dated May 19, 2015 (20 pages).
Kunz-Jacques, et al., "Using Hash-Based Signatures to Bootstrap Quantum Key Distribution," 9 pp. (Sep. 2011).
Los Alamos National Laboratory, "Quantum Smart Card—QKarD," 1 p.
Ma et al., "High Speed Quantum Key Distribution Over Optical Fiber Network System," Journal of Research of NIST, vol. 114, No. 3, 29 pp. (May-Jun. 2009).
MagiQ Technologies, Inc., "MAGIQ QPNTM 8505 Security Gateway Uncompromising VPN SecurityTM," 4 pp. (document marked 2007).
Menendez et al., "Network Applications of Cascaded Passive Code Translation for WDMcompatible Spectrally Phase-encoded Optical CDMA," Journal of Lightwave Technology, vol. 23, No. 10, 13 pp. (2005).
Menezes et al, "Handbook of Applied Cryptography," Table of Contents and Chapters 11-13, 177 pp. (1997).
Mink, "Custom Hardware to Eliminate Bottlenecks in QKD Throughput Performance," Proc. SPIE, vol. 6780, 6 pp. (Sep. 2007).

MIT Technology Review, "Government Lab Reveals It Has Operated Quantum Internet for Over Two Years," 10 pp. (May 6, 2013).
Mitsubishi Electric Corporation Press Release, "Mitsubishi, NEC, Tokyo University Realize Successful Interconnection of Quantum Encryption Networks for First Time in Japan," 4 pp. (document marked May 12, 2006).
Mitsubishi Electric Corporation, "Mitsubishi Electric Advance: Cryptography Edition," vol. 100, 29 pp. (Dec. 2002).
Mitsubishi Electric Corporation, "Mitsubishi Electric Advance: Information Security Technology," vol. 126, 27 pp. (Jun. 2009).
Mitsubishi Electric, "One-time Pad Mobile Phone Software," 1 pp. (Oct. 2010).
National Institute of Information and Communications Technology Press Release, "Inauguration of the Tokyo QKD Network," 3 pp. (document marked Oct. 14, 2010).
Nordholt, et al., "A New Face for Cryptography," Los Alamos Science, No. 27, pp. 68-85 (2002).
Nordholt, et al., "Present and Future Free-space Quantum Key Distribution," Proc. SPIE Free-Space Laser Communication Technologies XIV, vol. 4635, pp. 116-126 (Apr. 2002).
Peev et al., "The SECOQC Quantum Key Distribution Network in Vienna," New Journal of Physics, vol. 11, 37 pp. (Jul. 2009).
Peters et al., "Dense Wavelength Multiplexing of 1550 nm QKD with Strong Classical Channels in Reconfigurable Networking Environments," New Journal of Physics, vol. 11, 17 pp. (Apr. 2009).
Quintessence Labs Pty. Ltd., "Breakthrough Technology," "Optical Subsystem Module/Card," "Modules of Operation," and "Application Areas," 5 pp. (documents downloaded from the World Wide Web on Sep. 9, 2011).
Rass, et al., "Quantum Coin-Flipping-Based Authentication," IEEE, 5 pp. (Jun. 2009).
Rosenberg et al., "Long-Distance Decoy-State Quantum Key Distribution in Optical Fiber," Physical Review Letters, vol. 98, 4 pp. (Jan. 2007).
Rosenberg et al., "Practical Long-distance Quantum Key Distribution System Using Decoy Levels" New Journal of Physics, vol. 11, 10 pp. (Apr. 2009).
Rosenberg et al., "Quantum Key Distribution at Telecom Wavelengths with Noise-free Detectors," 8 pp. (also published as Rosenberg et al., "Quantum Key Distribution at Telecom Wavelengths with Noise-free Detectors," IEEE Applied Physics Letters, vol. 88, Issue 2, pp. 21108-1-21108-3 (Jan. 2006)).
Runser, et al., "Progress Toward Quantum Communications Networks: Opportunities and Challenges," Optoelectronic Intef.{rated Circuits IX, vol. 6476, 15 pp. (Mar. 2007).
Schneider, "A Critical Look at Wireless Power," IEEE Spectrum, 10 pp. (May 2010).
SECOQC, "SECOQC White Paper on Quantum Key Distribution and Cryptography," Secoqc-WP-v5, 28 pp. (Jan. 22, 2007).
Shih, et al., "New Efficient Three-Party Quantum Key Distribution Protocols," IEEE Journal of Selected Topics in Quantum Electronics, vol. 15, No. 6 pp. 1602-1606 (Nov./Dec. 2009).
Toliver, et al., "Demonstration of 1550 nm QKD with ROADM-based DWDM Networking and the Impact of Fiber FWM" Conference on Lasers and Electro-Optic, 2 pp. (May 2007).
Toliver, et al., "Experimental Investigation of Quantum Key Distribution Through Transparent Optical Switch Elements," IEEE Photonics Technology Letters, vol. 15, Issue 11, pp. 1669-1671 (Nov. 2003).
Troiani, "Los Alamos Lab Uses Quantum Physics for Mobile Security," 2 pp., downloaded from http://www.thenewnewinternet.com/2012/01/26/los-alamos-lab-uses-quantumphysics-for-mobile-security/ (Jan. 26, 2012).
Vittorio, "Quantum Cryptography: Privacy Through Uncertainty," ProQuest, 9 pp. (Oct. 2002).
Wegman, et al., "New Hash Functions and Their Use in Authentication and Set Equality" Journal of Computer and System Sciences, vol. 22, Issue 3, pp. 265-279 (Jun. 1981).
Wikipedia, "Key Distribution," 5 pp. (2010).
Wikipedia, "One-time Pad," 12 pp. (2010).
Wikipedia, "Quantum Cryptography," 10 pp. (2010).
Written Opinion dated Mar. 21, 2012, from International Patent Application No. PCT/US2011/054070, 4 pp.

(56) References Cited

OTHER PUBLICATIONS

Yamamura, A. and Ishizuka, H., "Error Detection and Authentication in Quantum Key Distribution," Lecture Notes in Computer Science, vol. 2119, pp. 260-273 (2001).
Yao, "Polarization in Fiber Systems: Squeezing out More Bandwidth," The Photonics Handbook, 5 pp. (2003).

* cited by examiner

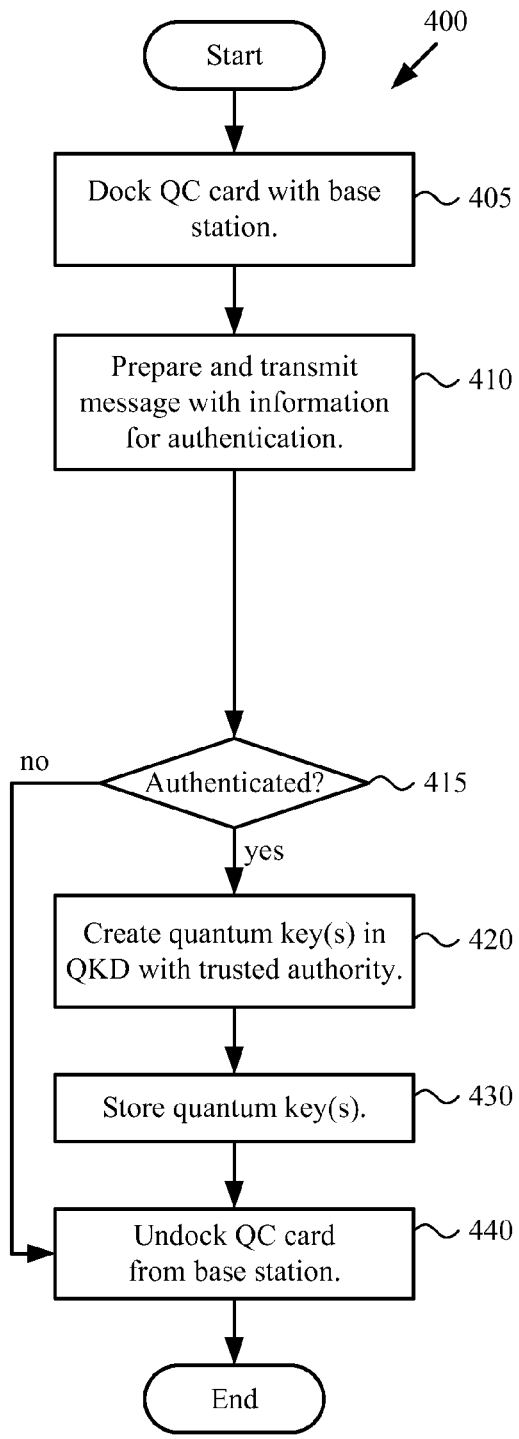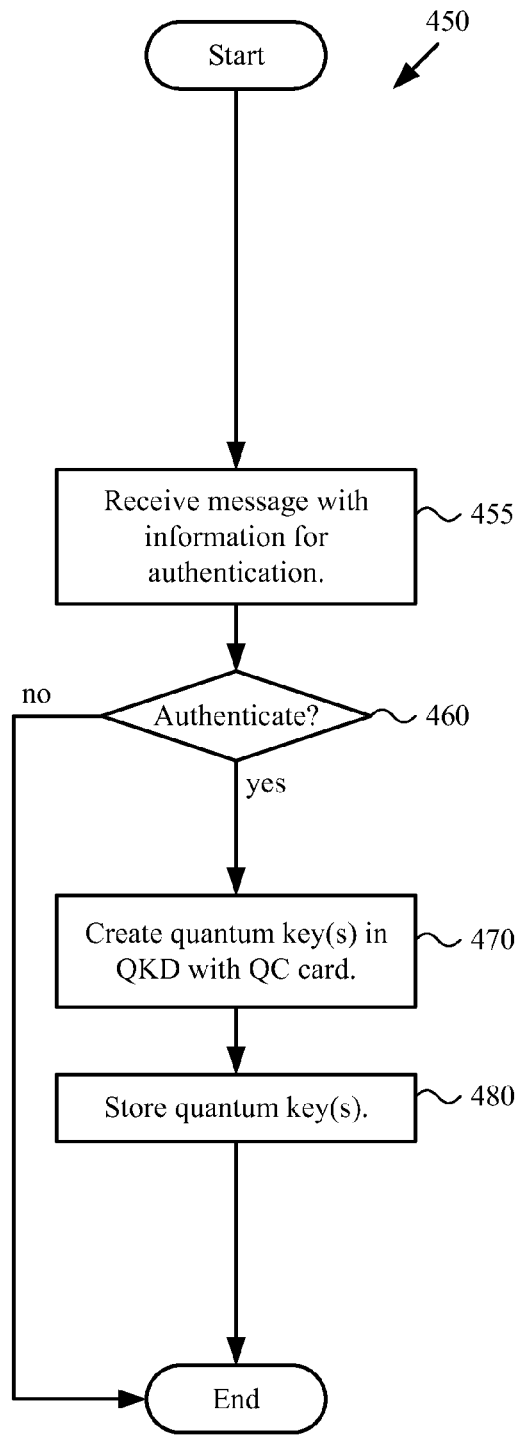

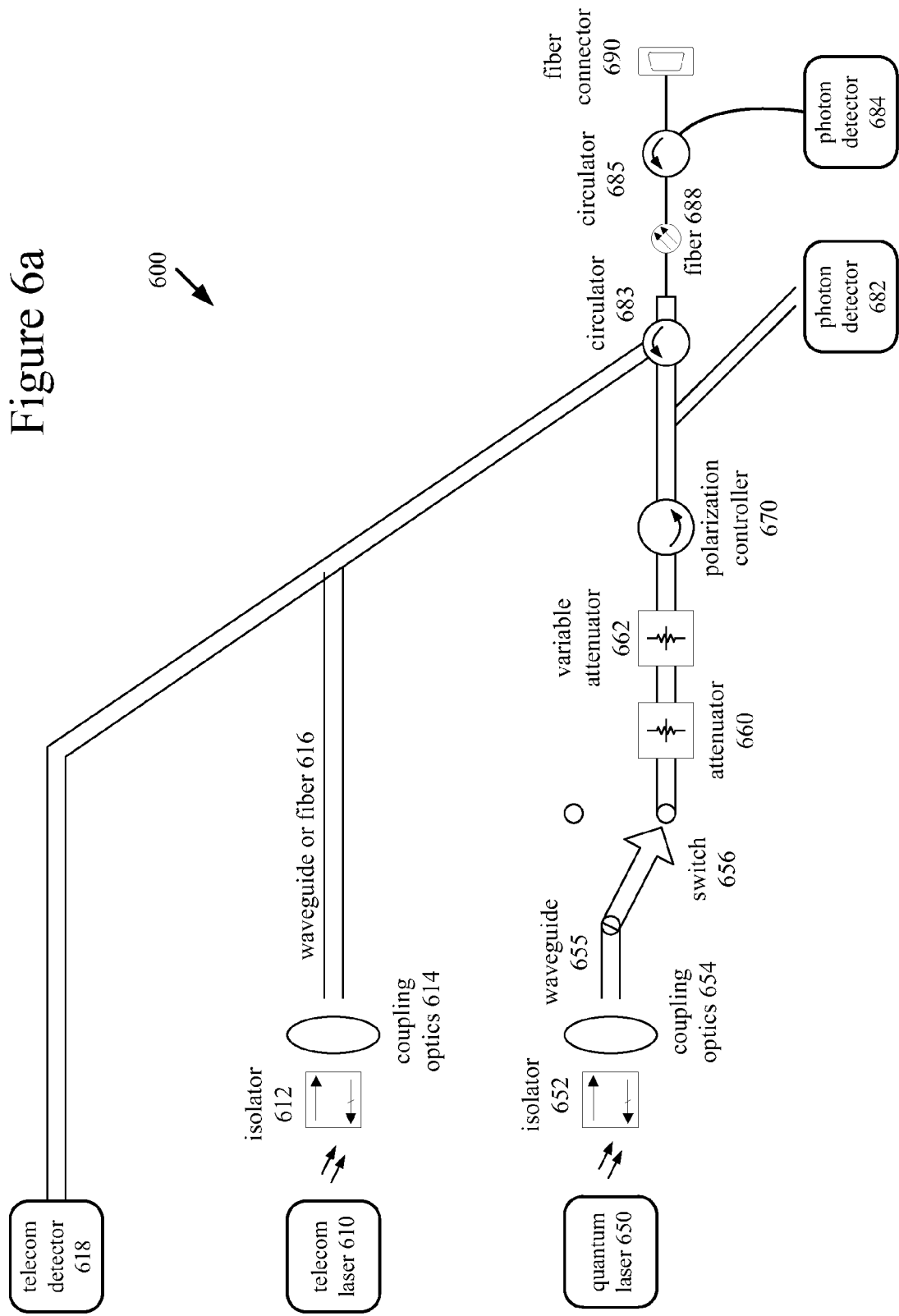

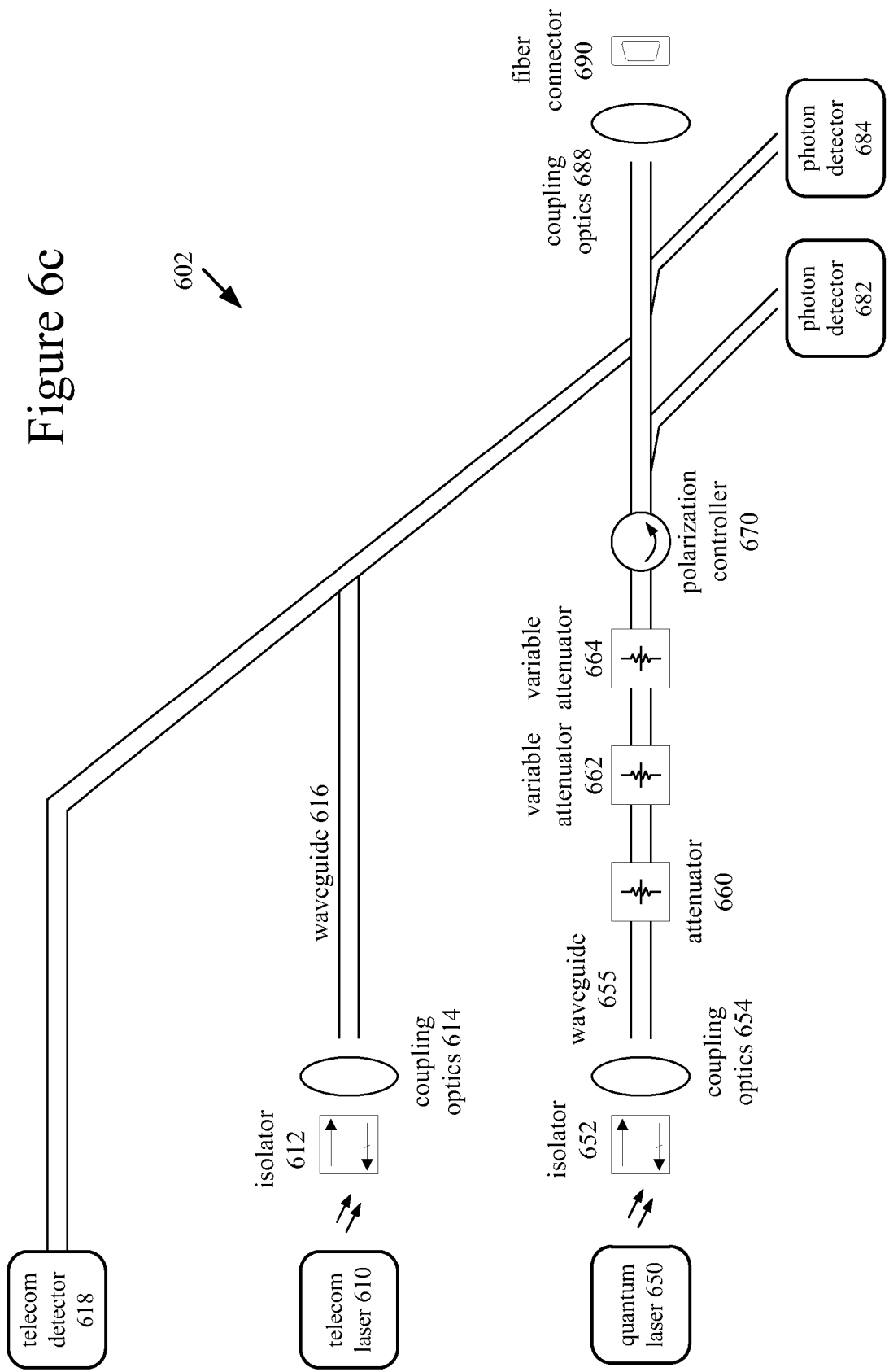

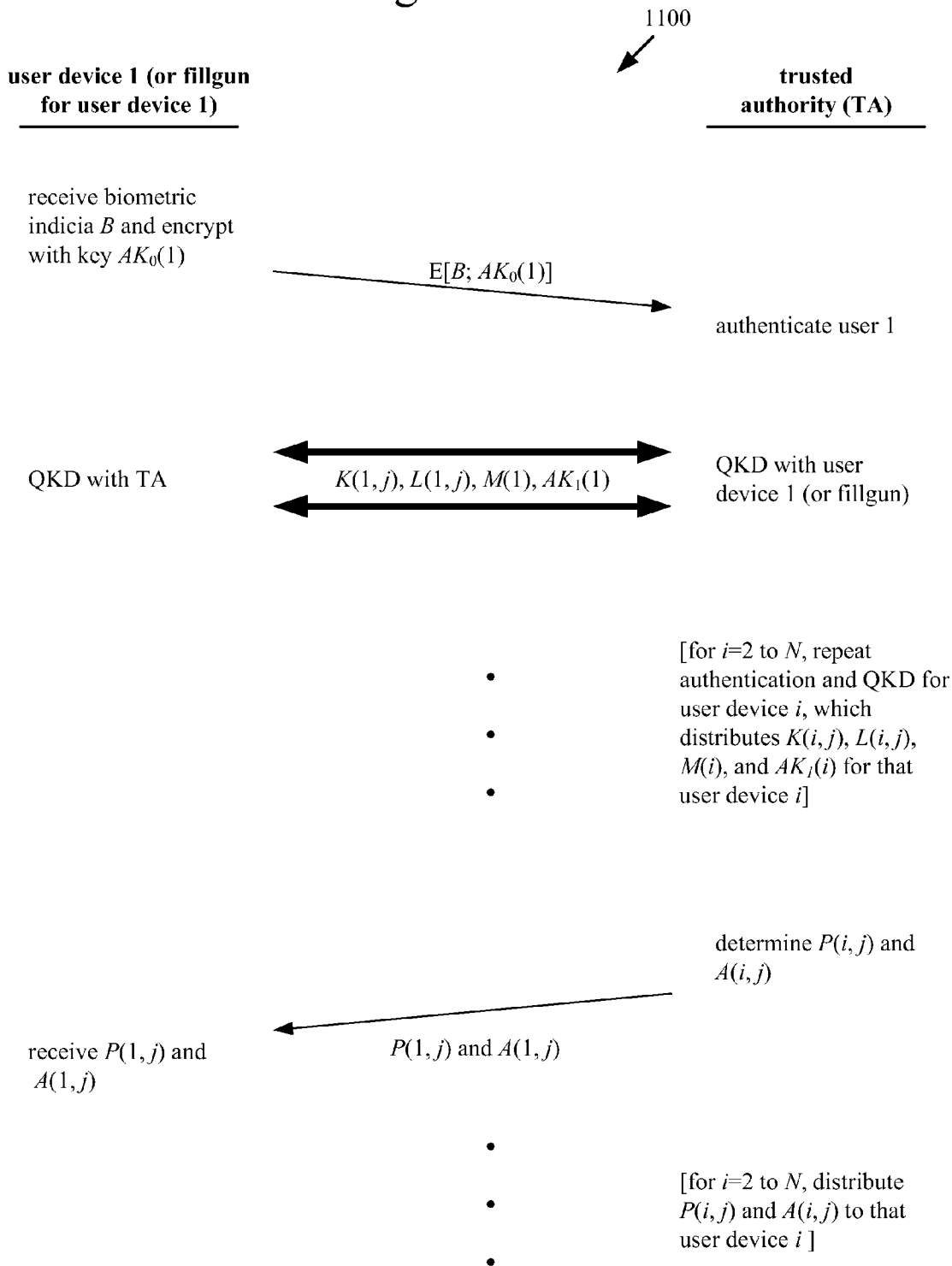

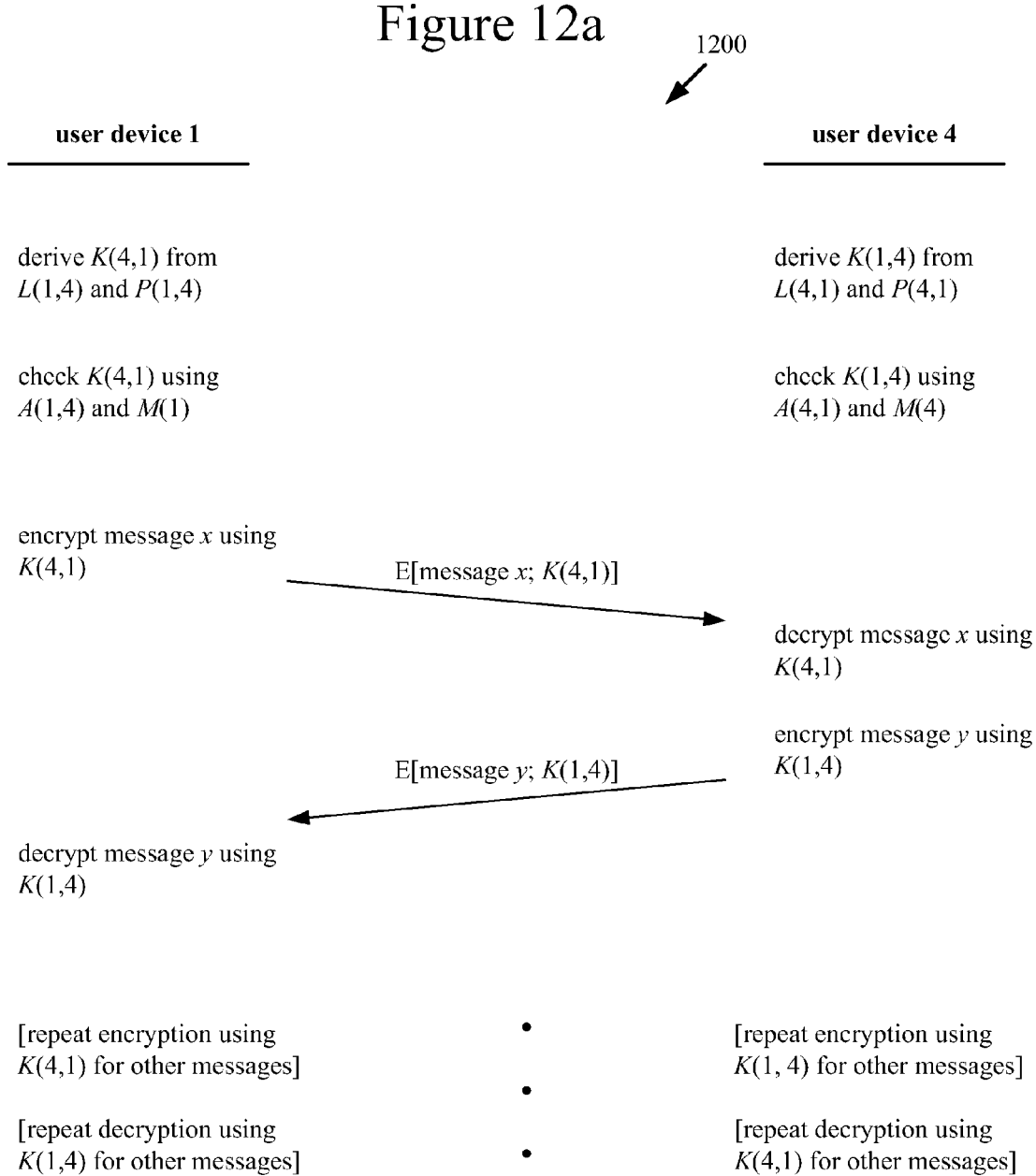

Figure 12b

1250 user device 1            user device 4 derive $K(4,1)$ from $L(1,4)$ and $P(1,4)$ check $K(4,1)$ using $A(1,4)$ and $M(1)$ generate session key $S(1,4)$ encrypt $S(1,4)$ using $K(4,1)$

→ $E[S(1,4); K(4,1)]$ → decrypt $S(1,4)$ using $K(4,1)$ encrypt message $x$ using $S(1,4)$

← $E[\text{message } x; S(1,4)]$ ← decrypt message $x$ using $S(1,4)$ encrypt message $y$ using $S(1,4)$

→ $E[\text{message } y; S(1,4)]$ → decrypt message $y$ using $S(1,4)$

[repeat encryption and decryption using $S(1,4)$ for other messages]

•
•
•

[repeat encryption and decryption using $S(1,4)$ for other messages]

SECURE MULTI-PARTY COMMUNICATION WITH QUANTUM KEY DISTRIBUTION MANAGED BY TRUSTED AUTHORITY

CROSS REFERENCE TO RELATED APPLICATION

This application is a Continuation of U.S. patent application Ser. No. 13/912,010, entitled "Secure Multi-Party Communication with Quantum Key Distribution Managed by Trusted Authority", filed Jun. 6, 2013, which is a Continuation of U.S. patent application Ser. No. 12/895,367, entitled "Secure Multi-Party Communication with Quantum Key Distribution Managed by Trusted Authority", filed Sep. 30, 2010, now U.S. Pat. No. 8,483,394, which claims the benefit of priority to U.S. Provisional Application No. 61/355,117, filed Jun. 15, 2010, the disclosures of which are hereby incorporated by reference in their entirety.

ACKNOWLEDGEMENT OF GOVERNMENT SUPPORT

The United States government has rights in this invention pursuant to Contract No. DE-AC52-06NA25396 between the United States Department of Energy and Los Alamos National Security, LLC for the operation of Los Alamos National Laboratory.

FIELD

A trusted authority distributes quantum keys to different user devices, which use the quantum keys for secure multi-party communication.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages. The process of producing such keys through QC is also called quantum key distribution ("QKD").

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QKD, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear or diagonal), sets the polarization state for a photon in the selected basis, and records the bit value (0 or 1), the selected sending basis and the time of transmission.

TABLE 1

Example of bases and quantum states

| Basis | 0 | 1 |
|---|---|---|
| Rectilinear (+) | 90° | 0° |
| Diagonal (x) | 45° | 135° (or −45°) |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set 1 measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

For the bases and states shown in Table 1, for example, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0 (90°) and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Other approaches to QC exploit other quantum properties (e.g., quantum entanglement) to exchange information encoded in quantum states. In addition, techniques such as privacy amplification can be used to eliminate the partial information that an eavesdropper can acquire. Techniques such as information reconciliation can be used to resolve small discrepancies in the shared bit values of the transmitter and receiver.

The theoretical framework for QC has been established for over 25 years, and its advantages in terms of security of keys are well accepted. Over the past two decades, implementations of QKD systems have become cheaper, more reliable, easier to maintain (e.g., self-tuning, self-checking), and easier to use. Even so, compared to other security solutions that use public key cryptography, QKD system have tended to be expensive and difficult to deploy. A typical QKD system is large and operates only in point-to-point mode over a fiber connection between transmitter and receiver. Several commercially available QKD systems perform QKD only over point-to-point links, are not portable, and require a dedicated fiber connection. Moreover, their QC cannot co-exist with network traffic. As a result, despite the general knowledge that threats to public key cryptography exist from ever more powerful computers, QKD has not gained a commercial foothold.

SUMMARY

Innovations described herein facilitate the use of quantum key distribution ("QKD"). These innovations help make QKD more practical and useful for secure multi-party communication, authentication, access control and other applications.

According to one aspect of the innovations described herein, a computing system that implements a trusted authority facilitates secure communication between multiple user devices. The computing system distributes one or more first quantum keys by first QKD under a first trust relationship between the trusted authority and a first user, and distributes one or more second quantum keys by second QKD under a second trust relationship between the trusted authority and a second user. The QKD can be between the trusted authority and a user device, or between the trusted authority and a fillgun device (which conveys the keys to a user device). The computing system determines one or more combination keys based at least in part upon at least one of the first quantum key(s) and at least one of the second quantum key(s). The computing system makes the combination key(s) available for distribution (e.g., for non-secret distribution over a public channel). The combination key(s) facilitate secure communication between a first user device and second user device even in the absence of QKD between the first and second user devices.

In some implementations, the computing system that implements the trusted authority authenticates the first user and the second user before the first QKD and the second QKD, respectively, to establish the respective trust relationships. For example, the authentication uses pre-placed keys for the respective users, which can then be replaced with quantum keys resulting from the QKD. The system that implements the trusted authority can also use password-based authentication with a quantum identification protocol ("QIP"). For example, before the first QKD and the second QKD, respectively, the system uses a first (or second) password within a QIP for authentication between the first (or second) user and the trusted authority. The password can include a set of multiple alphanumeric characters input by the user, a high entropy key stored at the user device and/or a digest based on biometric indicia for the user.

In some use scenarios, the first quantum key(s) include a key derivation key, the second quantum key(s) include an encryption key for the second user device, and one of the combination keys is determined from the key derivation key and the encryption key for the second user device. The first quantum key(s) can also include a key authentication key, and the computing system that implements the trusted authority can create a key authentication value from the encryption key for the second user device and the key authentication key. In other use scenarios, the first and second quantum keys are used in other ways.

In some configurations, the computing system that implements the trusted authority has a single physical node. In other configurations, the system that implements the trusted authority is distributed among multiple physical nodes, and quantum secret sharing is used to facilitate QKD for a given user and the multiple physical nodes of the trusted authority. A trusted authority can be part of a hierarchy of trusted authorities or be the only trusted authority.

According to another aspect of the innovations described herein, a first user device retrieves one or more first quantum keys that result from QKD with a trusted authority under a trust relationship between the trusted authority and a first user. The first user device also retrieves a combination key that is based at least in part upon one of the first quantum key(s) and a key for a second user device. The first user device communicates with the second user device based at least in part on one of the first quantum key(s) and the combination key. The combination key facilitates secure communication between the first and second user devices even in the absence of QKD between the first and second user devices.

In some implementations, before the QKD, the first user device receives biometric indicia for the first user, encrypts the biometric indicia using a pre-placed secret key, and transmits the encrypted biometric indicia to the trusted authority for authentication of the first user to establish the trust relationship. The first quantum key(s) can include a new key for use in subsequent authentication of the first user. Moreover, before the QKD, the first user device can use a password within a QIP for authentication of the first user to the trusted authority and for authentication of the trusted authority to the first user.

In some use scenarios, the first quantum key(s) include a key derivation key, and the first user device determines the key for the second user device from the key derivation key and the combination key. The first quantum key(s) can further include an encryption key for the first user device, where the encryption key for the first user device is used to encrypt messages to the second user device, and the key for the second user device is used to decrypt messages from the second user device. Or, the first user device can decrypt a message from the second user device using the key for the second user device, where the message includes a session key, then use the session key to encrypt/decrypt messages to/from the second user device. Or, the first quantum key(s) can include other keys used for secure communication.

In group keying scenarios, the first quantum key(s) include a different key for each of multiple user devices other than the first user device. The first user device, as a group leader, determines a group session key. For each of the multiple user devices other than the first user device, the first user device encrypts the group session key using an encryption key specific to pair-wise communication between the first user device and the other user device, and communicates the encrypted group session key to the other user device. The first user device can also assign sub-group keys to sub-groups of the multiple user devices and assign individual group member keys to individual ones of the multiple user devices.

According to another aspect of the innovations described herein, a user device includes a processor, memory and storage storing computer-executable instructions for causing the user device to perform a method of secure communication with a target device. For the secure communication, the user device retrieves a key derivation key that results from QKD with a trusted authority, and retrieves a pair key that is based at least in part on the key derivation key and a key for the target device. The user device derives the key for the target device from the key derivation key and the pair key. The user device then uses the key for the target device in communication with the target device. In some implementations, the user device also retrieves a key authentication key that results from the QKD with the trusted authority, and retrieves a reference key authentication value made available by the trusted authority. The user device determines a check key authentication value from the key for the target device and the key authentication key, then compares the check key authentication value to the reference key authentication value.

According to another aspect of the innovations described herein, a computing system that implements a trusted authority distributes one or more first quantum keys by QKD, where the first quantum key(s) include an encryption key for a first user device. The computing system also distributes one or more second quantum keys by QKD, where the second quantum key(s) include a key derivation key for a second user device. The computing system determines a pair key based at least in part on the encryption key for the first user device and the key derivation key for the second user device, and makes the pair key available for distribution. The pair key is usable by the second user device in combination with the key derivation key for the second user device to determine the encryption key for the first user device. In some implementations, the second quantum key(s) further include a key authentication key for the second user device. The computing system that implements the trusted authority determines a key authentication value from the encryption key for the first user device and the key authentication key for the second user device. The computing system makes the key authentication value available for distribution. The key authentication value is usable by the second user device in combination with the key authentication key for the second user device to authenticate the encryption key for the first user device.

According to another aspect of the innovations described herein, a computing system that implements a child trusted authority in a hierarchy facilitates secure communication between multiple user devices. For example, a first child trusted authority is part of a hierarchy that includes a second child trusted authority and a parent trusted authority. The first child trusted authority distributes first quantum keys by first QKD under a trust relationship between the first child trusted authority and a first user. Separately, the second child trusted authority distributes second quantum keys by second QKD under a trust relationship between the second child trusted authority and a second user. The first child trust authority retrieves third quantum keys that result from third QKD with the parent trusted authority. The first child trust authority then uses one of the third quantum keys and one of the first quantum keys to facilitate communication between two user devices. For example, the first child trust authority receives an encrypted session key from the parent trusted authority and decrypts the encrypted session key using one of the third quantum keys. Then, the first child trust authority re-encrypts the session key using one of the first quantum keys, and distributes the re-encrypted session key to a first user device.

The foregoing and other objects, features, and advantages of the invention will become more apparent from the following detailed description, which proceeds with reference to the accompanying figures.

BRIEF DESCRIPTION OF THE DRAWINGS

FIGS. 4a and 4b are flowcharts illustrating different aspects of a generalized protocol for QKD in a framework with a QC card, base station and trusted authority.

FIGS. 6a-6c are block diagrams of example implementations of integrated optics modules for a QC card.

FIG. 11 is a diagram illustrating an example protocol that includes QKD between a trusted authority and one or more user devices for secure multi-party communication.

FIGS. 12a and 12b are diagrams illustrating protocols for modes of operation in secure multi-party communication between user devices.

DETAILED DESCRIPTION

Figure 1:
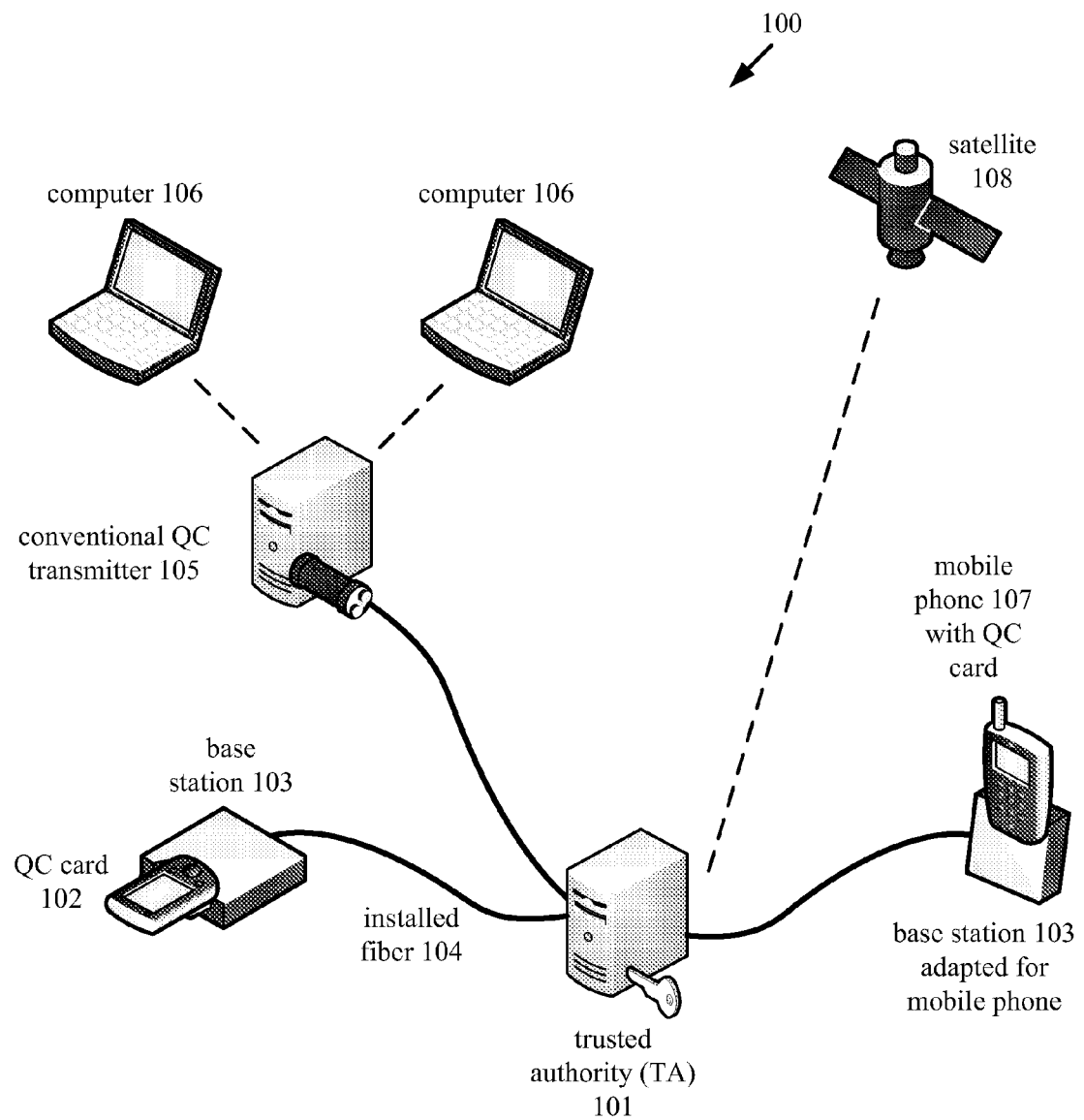
FIGS. 1, 2 and 3 are diagrams of example operating environments in which keys are acquired through QKD, disseminated, and used for encryption, authentication and access control.

Techniques and tools for quantum key distribution ("QKD") between a quantum communication ("QC") card, base station and trusted authority are described herein. In example implementations, the QC card is a relatively inexpensive, portable device that couples with a base station and acquires keys through QKD with a trusted authority. The keys can be used to set up secure communication, for authentication, for access control, or for other purposes.

Techniques and tools for implementing protocols for secure multi-party communication after QKD are also described herein. With the protocols, benefits of QKD such as forward security and resistance to archival attacks are extended to multi-party communication scenarios. In addition, the protocols retain benefits of QKD even when user devices lack a quantum link with each other, a trusted authority is offline or a large group seeks to establish secure communication within the group.

The protocols for secure multi-party communication can be used with the QC cards, with devices that acquire keys from QC cards and/or with devices that acquire keys through conventional QKD with a trusted authority. Conversely, the QC card/trusted authority framework can be used with the secure multi-party communication protocols described herein or with other protocols.

For the sake of presentation, in some places, the term "trusted authority" is used as shorthand for a computing system that implements the role of trusted authority, and the term "user" is used to indicate a computing system associated with a user. Unless the context clearly indicates otherwise, operations described herein are implemented with and performed by computing systems. For example, description of transmission of information to a trusted authority or user, determination of a value, and receipt of information from a trusted authority or user generally indicate operations with a computing system associated with the trusted authority or user. On the other hand, description of user input or biometric input to a user device implies a human user providing such input.

In addition, the terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose computer hardware with software implementing the functionality described herein. The term "user device" generally indicates a computing system associated with a user.

Various alternatives to the implementations described herein are possible. Certain techniques described with reference to flowchart diagrams can be altered by changing the ordering of stages shown in the flowcharts, by splitting, repeating or omitting certain stages, etc. Different aspects of the QKD framework and secure multi-party communication protocols described herein can be used in combination or separately. Different embodiments implement one or more of the described techniques and tools. Some of the techniques and tools described herein address one or more of the problems noted in the background. Typically, a given technique/tool does not solve all such problems.

I. Example Operating Environments

FIG. 1 shows an example operating environment (100) in which various user devices acquire keys through QKD with a trusted authority (101). The user devices include a QC card (102) that couples with a base station (103), a mobile phone (107) that has a QC card, a satellite (108), and several computers (106) connected to a conventional QC transmitter (105). A user device can be for an individual user or for a business, financial institution or government institution as user.

A computing system implements the trusted authority (101). The trusted authority (101) authenticates a user, produces quantum keys in communication with a user device (or conventional QC transmitter (105)), and stores the quantum keys. At some point, the trusted authority (101) performs QKD with different devices, and the trusted authority (101) stores quantum keys produced in the different QKD sessions. Using quantum keys and other information provided by the trusted authority (101), a given user device can securely communicate with other user devices that have quantum keys from QKD with the trusted authority (101).

The QC card (102) contains a miniaturized QC transmitter. The QC card (102) couples with a base station (103), which provides a network connection with the trusted authority (101) and can provide electric power to the QC card (102). Example implementations for a base station (103), QC card (102), and trusted authority adapted for QKD with a QC card (102) are detailed in Section II. Whereas conventional QKD solutions have tended to be expensive and difficult to deploy, example implementations of the QC card (102) and base station (103) are relatively inexpensive. A QC card (102) is easily carried, and quantum keys generated with QKD facilitate security that is stronger than that provided with conventional non-quantum key distribution.

To generate quantum keys, a user inserts the QC card (102) into the base station (103). Typically, as a precondition for QKD, the trusted authority (101) authenticates the user. For example, the QC card (102) accepts a fingerprint scan and personal identification number ("PIN") from the user, encrypts the PIN and fingerprint scan data, and transmits the encrypted material to the trusted authority (101) for comparison against information previously provided to the trusted authority (101). Alternatively, the QC card (102) accepts other biometric information and/or other information that identifies the user.

The QC card (102) then performs QKD with the trusted authority (101) and stores the resulting quantum keys in secure memory on the QC card (102). In FIG. 1, the base station (103) is connected to the trusted authority (101) over installed fiber (104). The installed fiber (104) is used as a quantum channel for point-to-point QKD between the QC card (102) and trusted authority (101), for example, for transmission of photons encoded with quantum state information. The point-to-point QKD can happen over a single optical span or multiple spans in a fiber network whose topology supports QKD. For example, the topology includes intermediate routers between the QC card and trusted authority, but the routers preserve quantum state information. In FIG. 1, the installed fiber (104) is also used as a public channel to exchange non-quantum information between the QC card (102) and trusted authority (101), for example, authentication information, non-quantum information about measuring bases, recording basis in the QKD, and/or non-secret key information from the trusted authority (101). Alternatively, the QC card (102) and trusted authority (101) communicate non-quantum information over another type of network media (e.g., copper, RF) or free space (optical), or over a fiber network having another network topology.

In one use scenario, a business purchases QC cards (102) for its employees and purchases one or more base stations (103) located at its facilities. An employee periodically plugs his or her QC card (102) into a base station to load up on quantum keys. The employee can then use the quantum keys for activities such as purchasing over the Internet, authentication or access control at a remote site.

The mobile phone (107) includes a QC card (102) as well as conventional mobile phone components. The mobile phone (107) couples with a base station (103) that is adapted to connect to the mobile phone (107) and provides a network connection to the trusted authority (101). The mobile phone's base station (103) can also provide electric power and a data connection for synchronization of information on the mobile phone (107). The mobile phone (107) stores quantum keys produced by the QC card (102) and trusted authority (101). Example implementations for a mobile phone (107) that includes a QC card are described below in Section II.

As shown in FIG. 1, the trusted authority (101) can also produce quantum keys for devices other than a QC card (102). For example, the trusted authority (101) performs QKD to distribute quantum keys to a low-orbit satellite (108) using equipment for QC transmission and reception through free space. Or, the trusted authority (101) performs QKD with a conventional QC transmitter (105), which directly conveys the quantum keys produced by QKD to a locally connected computer (106) at a secure facility. The conventional QC transmitter (105) can connect to the trusted authority (101) over installed fiber (104) (e.g., standard fiber for telecommunications in a building, FTTx link, metro area, etc.) or free space (e.g., rooftop to rooftop, airplane to ground, ship to ship, satellite to ground).

In any case, the QKD produces cryptographic-quality secret random numbers, which can be used as quantum keys for encryption, secure multi-party audio or video communication, authentication, bank transactions, facility access control, access control for a computing system or database, access control for an online control system, vehicle access, digital signatures, e-voting, tele-presence or another application. As random numbers, the quantum keys have forward secrecy. The quantum keys do not depend on any pre-placed secret key, and they are not subject to conventional attacks, nor are they vulnerable to future advances that exploit increased computing power or flaws discovered in key generation algorithms. Some of the quantum keys produced by QKD can be used for authentication and other set-up operations before subsequent QKD sessions, so that such set-up operations are automatic and seamless to the user.

In the examples shown in FIG. 1, the computing system that implements the trusted authority (101) has a QC receiver. Alternatively, computing system that implements the trusted authority (101) has a QC transmitter, and the other party to QKD includes a QC receiver.

Figure 2:
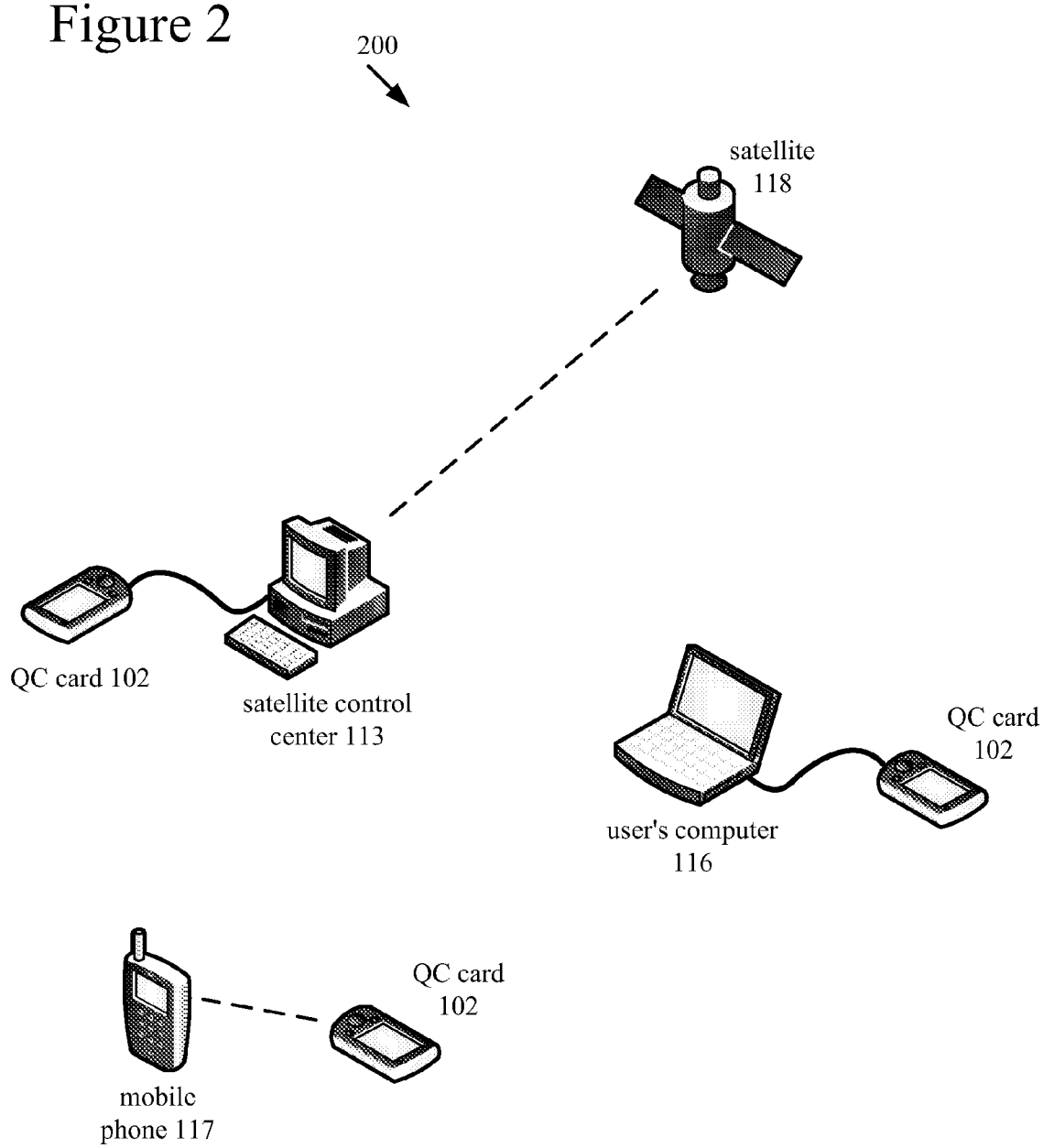

FIG. 2 shows an example operating environment (200) in which a QC card (102) further distributes quantum keys obtained through QKD with the trusted authority (101). A QC card (102) can distribute stored quantum keys to a mobile phone (117) or a user's computer (116). For example, the QC card (102) transmits the quantum keys over a point-to-point fiber connection or wireless connection. Or, a QC card (102) provides quantum keys to a satellite control center (113), which uploads the quantum keys to a satellite (118).

In this way, the QC card (102) can be used as a "fillgun" to load quantum keys from its secure memory into a remote encryptor on a spacecraft, naval vessel or other vehicle. For example, the QC card (102) loads up with quantum keys while coupled with a base station at a terminal, is carried to a spacecraft before launch, and then loads the quantum keys onto a computing device aboard the spacecraft. The computing device aboard the spacecraft can then use the quantum keys for secure communication with the terminal or another device.

Figure 3:
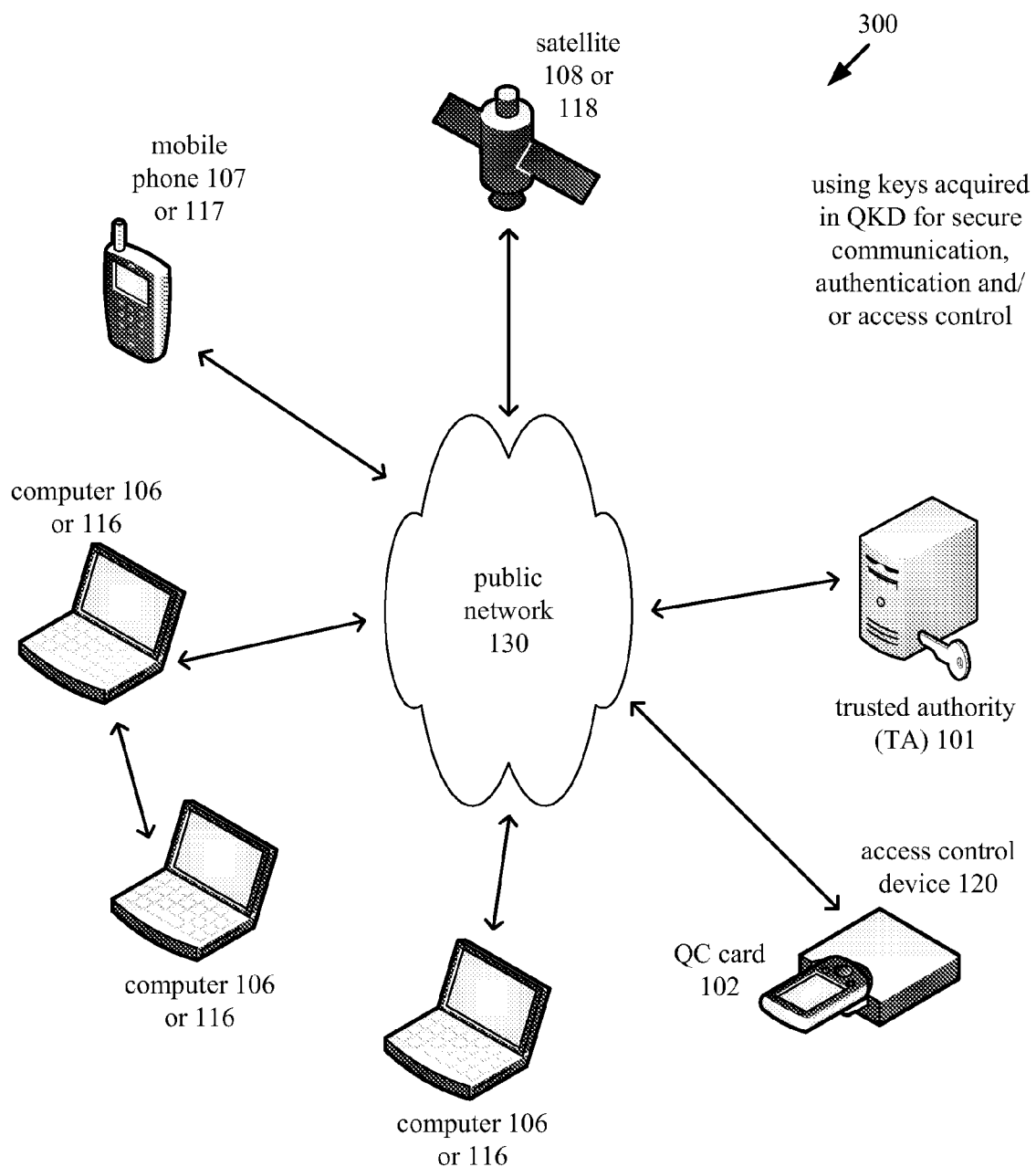

FIG. 3 shows an example operating environment (300) in which quantum keys distributed through QKD are used to establish secure communication, used for authentication or used for access control. With one or more quantum keys and information provided by the trusted authority (101), a user device can securely communicate with another user device directly or over a public network (130) such as the Internet. Or, the user device can use a quantum key to authenticate itself to another user device or gain access to a facility through an access control device (120). Within the network of user devices that have each received quantum keys from QKD with the trusted authority, one user device can establish a secure connection with any other user device without QKD between the two user devices.

A user device shown in FIG. 3 can acquire its quantum keys through any form of QKD with the trusted authority (101). Some of the user devices shown in FIG. 3 acquired quantum keys directly through QKD with the trusted authority (101), as illustrated in FIG. 1. For example, the mobile phone (107) and QC card (102) acquired quantum keys from QKD with the trusted authority. The user computers (106) acquired quantum keys directly from a local connection to a conventional QC transmitter in QKD with the trusted authority. Other user devices shown in FIG. 3 acquired quantum keys from a QC card, as shown in FIG. 2. For example, the satellite (118), mobile phone (117) and user computers (116) acquired quantum keys from a QC card (102). In any case, a user device can use its quantum keys at a location different than the location at which the quantum keys were distributed to the user device.

The trusted authority (101) is both a QC node (as in FIG. 1) and a conventional network contact point. Aside from QKD, acting in the role of a network server, the trusted authority (101) can exchange information using conventional network communication with a user device that acts in the role of a network client. In this way, the user device can receive information that is usable in combination with one of its stored quantum keys to establish a secure connection with another user device. Or, the user device can receive material from the trusted authority (101) that has been encrypted with one of its stored quantum keys.

Quantum keys can facilitate secure communication even when the quantum keys are not used for algorithmic encryption. If two user devices have the same quantum keys, a first user device can use stored quantum keys to determine patterns to spread information content between wavelengths and/or time slots of a signal, then spread the information according to the patterns in transmission. The second user device determines the patterns from the stored quantum keys and de-spreads the information content from the signal it receives. The patterns depend on the stored quantum keys, but security is provided at the physical layer in transmission, not through use of the stored quantum keys in encryption.

When the quantum keys are used, the trusted authority (101) can be online or offline. For example, suppose two devices have each acquired quantum keys from QKD with the trusted authority (101). To establish a secure connection with a second user device, a first user device contacts the trusted authority (101) over a public network (130) such as the Internet. The first user device receives information from the trusted authority (101) that can be used, with a quantum key at the first user device, to establish a secure connection with the second user device. The first and second user devices can then use a joint session key for secure communication over the public network (130) or otherwise. Or, the trusted authority (101) can provide such information to the first user device and/or second user device, then go offline. Even though the trusted authority is offline, the first and second user devices can subsequently establish a secure connection over the public network (130) or directly with each other. The information that the trusted authority (101) provides for use with the quantum keys can be provided in a non-secret way over the public network (130), since the information is only useful to the possessor of a quantum key. Section III describes example protocols for secure multi-party communication. The example protocols can be used for secure communication, authentication, access control, and other applications in operating environments such as the example environment (300) of FIG. 3.

II. QKD Using QC Card, Base Station and Trusted Authority

A typical smartcard is a small plastic device, the size of credit card, with an embedded microprocessor. Some smartcards use a hashing function and pre-placed secret keys to generate encryption keys. The encryption keys are then used according to conventional encryption techniques for communication, authentication, access control, etc. Although smartcards are relatively inexpensive and easy to carry, they do not provide security strong enough for many scenarios.

The mechanism of generating encryption keys using a hashing function is susceptible to attack with conventional computers. In the past, hashing functions have been undermined by improvements in algorithmic attacks, and there are no guarantees that current smartcard technology has not been successfully undermined already. At base, smartcards that use known algorithms to generate keys produce random numbers that do not have complete forward secrecy, which means a current key can potentially be predicted from the last key. An adversary can record numbers entered by a legitimate user from his smartcard and crack the algorithm or determine the pre-placed secret key, allowing the adversary to make usable keys to impersonate the legitimate user.

On the other hand, quantum keys produced by QKD have strong forward secrecy. To date, however, QC security solutions have tended to be expensive and difficult to deploy.

A QC card combines advantages of smartcard technology with advantages of QKD. In example implementations, a QC card is relatively inexpensive, lightweight and portable. A QC card stores quantum keys produced by QKD with a trusted authority, and the quantum keys have strong forward security.

In general, a QC card couples with a base station and produces quantum keys by QKD with a trusted authority. For example, a user inserts the QC card into the base station, and the QC card transmits authentication information to the trusted authority. If the user is authenticated, the QC card and trusted authority produce cryptographic-quality secret random numbers for quantum keys. The QC card stores the quantum keys in secure memory. The QC card can later use the quantum keys or distribute the quantum keys to another device for use. Either way, the quantum keys can be used for encryption, authentication, access control or digital signatures by a user. Because the quantum keys produced in QKD are randomly generated and do not depend on any pre-placed secret keys, the quantum keys provide strong security for access to facilities, access to computing systems, bank transactions, secure multi-party communication and other applications.

In some embodiments, a QC card includes a miniaturized QC transmitter, and the computing system for the trusted authority includes a QC receiver. For example, the QC card includes integrated electro-optical modules capable of selectively producing individual photons having any of four non-orthogonal polarization states for QKD (e.g., 0°, 45°, 90° or 135°). The QC card can be fabricated as a single integrated unit with a small footprint. Compared to conventional QC transmitters, the QC transmitter in the QC card is a low-power transmitter. Nonetheless, to the extent energy consumption might be a concern, the QC card can draw electric power from the base station at which the QC card is coupled for QKD. The QC card is lightweight and robust, and it can be packaged in a mobile phone or other device for which limited size, weight and power consumption are desirable attributes.

The QC card/trusted authority framework can produce quantum keys that are used for secure multi-party communication and authentication according to protocols described in section III. In example protocols, a trusted authority distributes quantum keys to different user devices. When the trusted authority is online, a user device can query the trusted authority for information used to set up communication with another device, authenticate the other device, or grant access to the other device. Even if the trusted authority is offline, the different user devices can use information previously provided by the trusted authority to securely communicate with each other or authenticate each other. In the example protocols, secure multi-party communication and authentication efficiently work with a relatively small number of quantum keys, and quantum keys can be periodically renewed with the trusted authority. In these respects and other respects, example protocols of section III are well-suited for use with quantum keys generated by a QC card and trusted authority. Alternatively, however, the QC card/trusted authority framework can produce quantum keys that are used for secure multi-party communication or authentication according to another protocol for key management and/or authentication. For example, the key management protocol can be a variation of Leighton-Micali protocol, and the authentication protocol can be a variation of Wegman-Carter authentication.

A. Generalized Techniques for QKD Between QC Card and Trusted Authority

FIG. 4a illustrates a generalized technique (400) for a QC card to acquire quantum keys through QKD with a trusted authority. Although some acts of FIG. 4a (e.g., docking QC card with a base station, undocking QC card from the base station) are physically performed by a user, the QC card performs corresponding acts (e.g., coupling, decoupling). FIG. 4b illustrates a corresponding technique (450) for the trusted authority to acquire quantum keys through QKD with the QC card.

With reference to FIG. 4a, a user docks (405) the QC card with a base station. At this point, the QC card couples to the base station for QC between the QC card and the trusted authority. The base station provides a network connection to the computing system that implements the trusted authority. Upon coupling with the base station, the QC card optically couples to the network connection of the base station. In some implementations, the optical coupling between the QC card and base station uses a fiber connection. Alternatively, the optical coupling uses a wireless connection (e.g., transmission over free space).

In some implementations, the network connection provided by the base station is a fiber connection to the computing system that implements the trusted authority. The network connection can be a dedicated point-to-point fiber connection for direct communication between the QC card and the trusted authority, a dedicated fiber connection over multiple spans connected with one or more optical routers enabling QC transmission and reception through the optical router(s), or a commercial (non-dedicated) fiber connection over a single span or multiple spans of a network of devices with QC transmission and reception equipment. QC typically uses weak photon pulses to mitigate problems that could arise from interception of extra photons. Dedicated fiber (sometimes called "dark" fiber) conveys weak photon pulses encoding quantum state information and may also convey bright synchronization pulses. The weak photon pulses are relatively easy to detect, however, due to the absence of other traffic. On the other hand, for QC over non-dedicated fiber, weak photon pulses that encode quantum state information are more difficult to detect. Non-dedicated fiber (sometimes called "light" fiber) conveys quantum-state-encoded information in weak photon pulses but also conveys conventional network traffic in bright pulses. Even when synchronization, temporal multiplexing and wavelength multiplexing are used to separate the weak photon pulses of a quantum signal from the bright pulses of other traffic, scattering and other impairments can complicate the task of detecting the weak photon pulses. Various steps can be taken to improve QC performance over non-dedicated fiber. For details, see (1) Peters et al., "Dense Wavelength Multiplexing of 1550 nm QKD with Strong Classical Channels in Reconfigurable Networking Environments," New Journal of Physics 11, 17 pp. (April 2009) and (2) Chapuran et al., "Optical Networking for Quantum Key Distribution and Quantum Communications," New Journal of Physics 11, 19 pp. (October 2009).

The network between the QC card and trusted authority can include a single span or multiple spans. If there are two spans, for example, and routing between them disrupts quantum state of the quantum-state-encoded information, the QC card can perform QKD with an intermediate trusted node, which also performs QKD with the trusted authority. The intermediate trusted node subsequently distributes quantum keys to the QC card and trusted authority, respectively, that have been encrypted using the quantum keys resulting from the respective QKD sessions. Or, if the quantum state is not disrupted, the QC card can perform QKD directly with the trusted authority across multiple spans.

Aside from providing a network connection, the base station can also provide power to the QC card. For example, when the user docks (405) the QC card, the QC card electrically couples with the base station. The QC card draws electric power from the base station. The QC card can use the electric power to power one or more integrated optics modules and/or cool one or more integrated optics modules to an operating temperature for QC. The electrical coupling between the QC card and base station can be implemented with a conventional wired technique, or the electrical coupling can be implemented with a wireless technique (e.g., to transfer power by electro-magnetic induction over a short range between the QC card and a charging pad of the base station). In some implementations, the QC card and trusted authority perform QC over free space, with the base station providing electric power to the QC card and/or aligning the QC card when the QC card is coupled to the base station.

Generally, in the techniques (400, 450) shown in FIGS. 4a and 4b, the base station is a "dumb" terminal that provides a network connection and, in some cases, electric power. The base station need not be trusted, since the QC card performs the actual QKD with the trusted authority. In alternative embodiments, such as those described at the end of section II.C, the base station is partially trusted or trusted and provides additional functionality for aspects of QKD.

When authentication of a user is a condition of QKD, the QC card prepares and transmits (410) a message with information for authentication. For example, the QC card receives identifying information for a user, such as a fingerprint scan, other biometric indicia, numeric input for a PIN, or other user input for personal information. The QC card encrypts the identifying information using an authentication key and transmits the encrypted information as the message to the trusted authority for authentication of the user.

To establish QC with the QC card coupled with the base station, the trusted authority authenticates the user. The trusted authority receives (455) the message with the information for authentication. The trusted authority checks (460) the message and, if appropriate, authenticates the user. For example, the trusted authority receives encrypted information as the message, where the information is identifying information for the user that has been encrypted using an authentication key. The trusted authority decrypts the identifying information using the authentication key and determines whether to authenticate the user based on the identifying information.

In general, for an initial QKD session between the QC card and trusted authority, the authentication key used to encrypt/decrypt the identifying information is a pre-placed key in the QC card that is known to the trusted authority. The initial key can be replaced with a quantum key subsequently generated in the QKD between the QC card and trusted authority. The new quantum key is stored in a special location in the QC card and trusted authority for use in authentication before the next QKD session. In this way, reuse of the initial authentication key is avoided and security is improved.

The trusted authority can send a message to the QC card indicating the user has been authenticated. The QC card checks (415) whether authentication of the user has succeeded.

If authentication has succeeded, the QC card and trusted authority create (420, 470) one or more quantum keys in QKD with each other. The quantum key(s) are produced based upon QC (information encoded in quantum states) and non-quantum communication (e.g., information exchanged over a public channel to settle upon the quantum keys) between the QC card and trusted authority.

The mechanics of the QC depend on implementation. For example, the QC card includes a connector that is optically coupled to one or more integrated optics modules for a QC transmitter, which is adapted to transmit information encoded in quantum states to a QC receiver of the trusted authority. The quantum-state-encoded information is transmitted in a quantum channel as part of the QC between the QC card and trusted authority through the base station. FIGS. 5 and 6a-6c show details for example QC cards with QC transmitters, and operations of the example QC cards are explained below with reference to those figures. Alternatively, the QC card includes one or more integrated optics modules for a QC receiver that receives information encoded in quantum states from a QC transmitter of the trusted authority. The QC card and trusted authority can use the same network connection for QC and non-quantum communication. For example, QC between the QC card and trusted authority uses a quantum channel over optical fiber, and non-quantum communication between the QC card and trusted authority uses a public channel over the optical fiber. Alternatively, the QC and non-quantum communication use different network connections. For example, the QC uses an optical connection but the non-quantum communication uses a non-optical connection.

The QC card stores (430) the quantum key(s). The trusted authority also stores (480) the quantum key(s). For example, the QC card stores the quantum key(s) in secure memory of the QC card, and the trusted authority stores the quantum key(s) in secure memory of the trusted authority.

The user then undocks (440) the QC card from the base station. At this point, the QC card decouples from the base station. In some scenarios, the QC card is used as a fillgun and transmits stored quantum keys to another user device for storage in memory of the other user device. In other scenarios, the QC card itself uses stored quantum keys for secure communication, authentication, access control, etc. with one or more other devices that have received quantum key information from the trusted authority.

For example, in some use scenarios, the QC card (or device including the QC card) contacts the trusted authority over a public channel (e.g., wireless Internet connection, cell phone connection), encrypts identifying information using a stored quantum key, and transmits the encrypted identifying information to the trusted authority over the public channel. The trusted authority responds with encrypted key material, which is decrypted using the same quantum key or the next stored quantum key. The key material can then be used for secure communication with the other device(s), authentication to the other device(s), access control past the other device(s), etc. The other device(s) similarly communicate with the trusted authority over the public channel and similarly receive encrypted key material that the respective other device(s) can decrypt and use.

In other use scenarios, instead of the respective QC cards (or devices) querying the trusted authority to provide encrypted secret key material, the trusted authority provides non-secret material to the QC cards (or devices). A first QC card (or device) uses some of the non-secret material and one of its stored quantum keys to determine another key to use for secure communication, authentication, etc. with a second QC card (or device). Section III describes variations of these use scenarios. Before use of a stored quantum key in this way, either QC card (or device) may perform user authentication against a locally stored or remotely stored biometric signature or PIN. An online trusted authority can provide the non-secret material to a QC card (or device) upon request. Or, a trusted authority can provide the non-secret material to QC cards (or devices) which then store the non-secret material, and the trusted authority need not be online when the non-secret material is later used.

In still other use scenarios, a QC card generates secure encryption keys used to encrypt payload data at a remote site. The encrypted payload data are returned to a secure location and, after the QC card has authenticated the user, decrypted using the secure encryption keys stored on the QC card. Depending on security level, the QC card can authenticate the user using a locally stored biometric signature or PIN, or the QC card can encrypt identifying information for the user and transmit the encrypted identifying information to the trusted authority for authentication. Or, using an approach described in one of the two preceding paragraphs, the QC card can communicate the secure encryption keys to another computing system that has been granted decryption privileges, and the other computing system can decrypt the encrypted payload data using the secure encryption keys. A variation of Leighton-Micali protocol can be used to transfer the secure encryption keys in an unclassified way, if necessary, by using a mathematical protocol with a secret key on the QC card. When key information is transferred over unsecure lines, the trusted authority can use this protocol and knowledge of secret bits already on the QC card (and other computer, if desired) to provide secure key transport.

Alternatively, the QC card and one or more other device(s) use quantum keys for secure communication or other functions according to another protocol.

B. Example QC Cards

Figure 5:
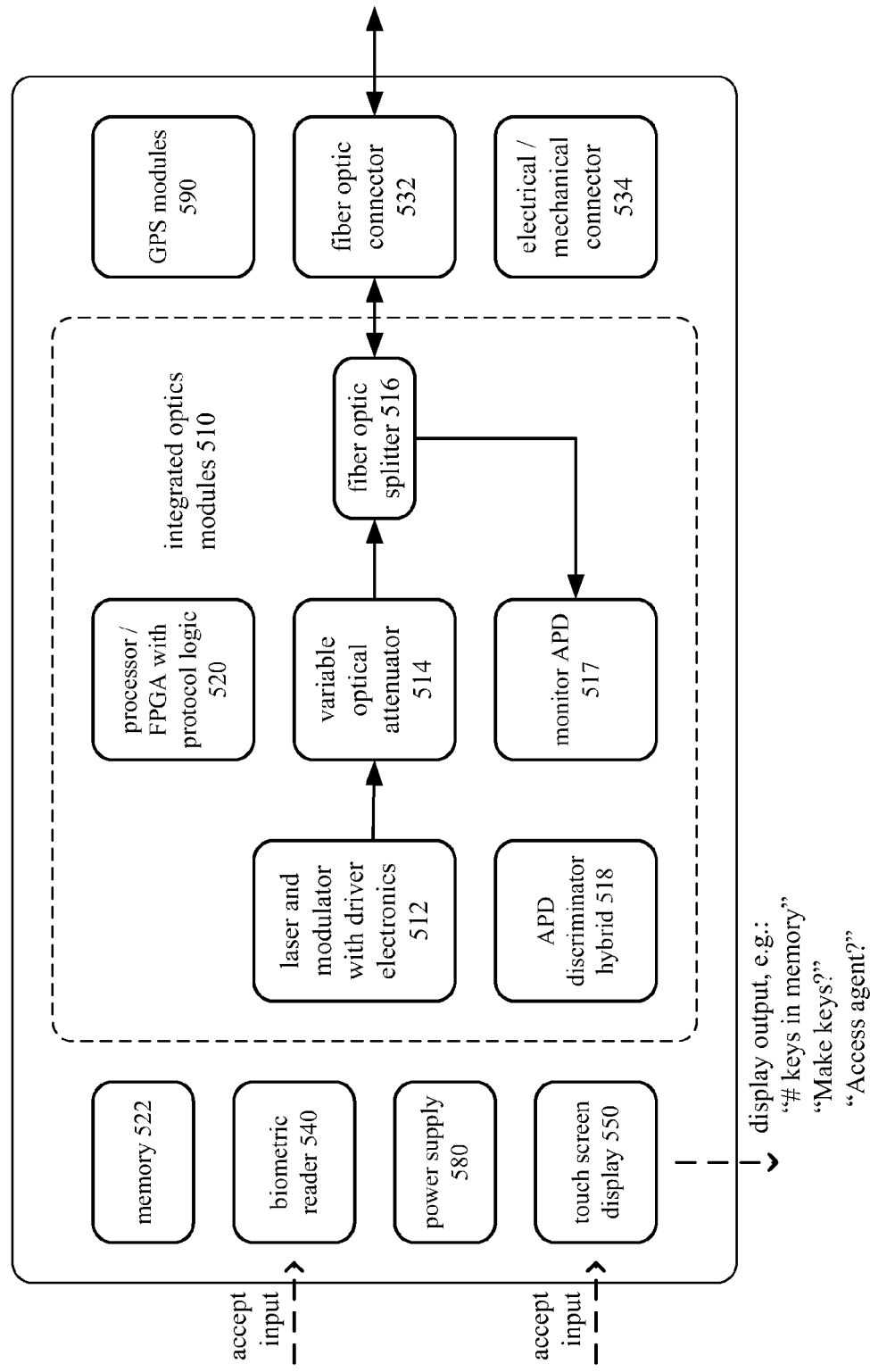
FIG. 5 is a block diagram of a generalized QC card.
Figure 6B:
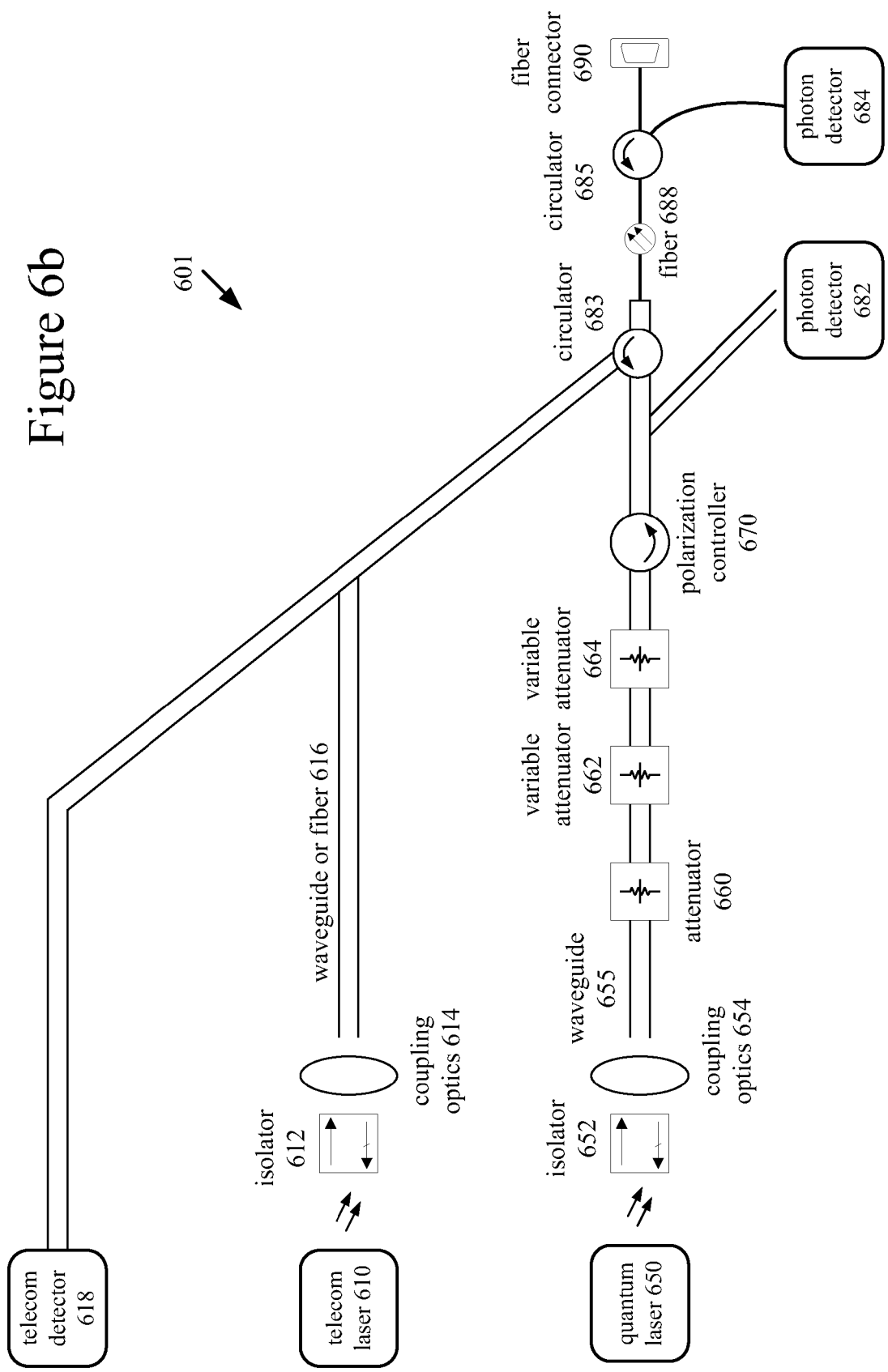

FIG. 5 shows an example QC card (500) adapted for use in a QC card/trusted authority framework. At a high level, the QC card (500) includes a connector (or connectors), integrated optics modules, and memory for storing quantum keys. The connector(s) are adapted to couple (via wired or wireless connection) with a base station for QC with a trusted authority. The integrated optics modules are adapted to transmit information as part of the QC through the base station. FIGS. 6a-6c detail example implementations of integrated optics modules, in which key electro-optical elements have been miniaturized in ways that increase stability for QC transmission while reducing weight and size.

1. Generalized QC Card

In FIG. 5, the integrated optics modules (510) are adapted for communication over non-dedicated optical fiber. For QC over the optical fiber as a quantum channel, the integrated optics modules (510) transmit binary information for which modulation of quantum state is measured (by the QC receiver). The integrated optics modules (510) also provide a network transceiver adapted to transmit and receive information in a public channel over the optical fiber, transmitting and receiving binary information for which modulation of quantum state is not measured (by the QC receiver).

Among the integrated optics modules (510), the laser and modulator with driver electronics (512) include a laser adapted to generate photons for transmission in the QC and a modulator adapted to modulate quantum state (e.g., polarization state) of output of the laser. The modulator is optically coupled to the laser and can be implemented, for example, with a lithium niobate modulator that modulates polarization state between 0°, 45°, 90° and −45°. (The system can use polarization tracking in the optical fiber to maintain the polarization state from the QC transmitter to QC receiver.) Alternatively, the modulator is implemented with another kind of integrated-optic or bulk-crystal modulator. The choice of modulator is implementation-specific and can depend, for example, on suitability of the modulator for the specific wavelength of light from the laser, operating frequency of the modulator and/or state purity for the polarization states produced.

The variable optical attenuator (514) is optically coupled to the laser. The attenuator is adapted to reduce photons per pulse of the laser, which improves security of the QC by foiling eavesdropping attempts that intercept extra photons. The monitor avalanche photodiode ("APD") (517) is split from other modules by the fiber optic splitter (516) and adapted to measure number of photons per pulse from the laser used for QC. For example, the APD (517) is implemented with one or more InGaAs photon detectors. The APD (517) provides feedback used to control the laser and attenuator (514) for QC. Another detector (not shown) receives information as a conventional fiber optic receiver for non-quantum communication.

The processor/field-programmable gate array ("FPGA") with protocol logic (520) controls different operations as part of the QC with the trusted authority. In particular, the processor/FPGA (520), which is electrically coupled to the module (512), is configured to coordinate operations of the laser and the modulator through driver electronics included with the laser and modulator (512). A random number generator generates a series of random bits for high-quality random numbers. With high-fidelity polarization control, the processor/FPGA (520) controls the polarization of photons with the modulator to encode random bits as different polarization states according to a QC protocol. The processor/FPGA (520) monitors the number of photons per pulse (measured with the APD (517)) for the QC. Through control of the laser and variable optical attenuator (514), the processor/FPGA (520) can selectively reduce photons per pulse of the laser to an average level of a single photon per pulse.

The processor/FPGA (520) thus controls the timing and pattern of the single-photon pulses produced by the laser for QC. The processor/FPGA (520) also controls the timing and pulses of bright pulses produced for synchronization, non-quantum communication and/or other purposes. The timing and pattern of single-photon pulses and bright pulses can follow a known pattern that is precisely timed by the GPS modules (590) and an oscillator. In addition to helping synchronize the QC transmitter of the QC card (500) and QC receiver at the trusted authority, the bright pulses can send polarized photons to the trusted authority for the trusted authority to track and correct polarization state variations due to the fiber connection between the QC card (500) and trusted authority.

In some implementations, the bright pulses are produced by a second laser that also provides functionality for a conventional transceiver (not QC). In other implementations, the same laser is used for QC transmission, QC control/tuning and conventional transceiver functions, but less attenuation is applied for the conventional transceiver functions and QC control/tuning functions. For example, the integrated optics modules (510) can include multiple attenuators to facilitate switching from transmission of a bright timing/control pulse to a single-photon pulse with the same laser. Use of a laser in the QC card (500) for synchronization, tuning, control, etc. operations with a QC receiver can be considered part of QC (since the QC timing/control pulses are interspersed with quantum-state encoded information), even though the timing/control pulses do not include quantum-state encoded information. The QC card (500) transmits other information (e.g., information about sending bases in QKD, other QKD protocol information, requests for non-secret key information from the trusted authority) in non-quantum communication over the optical fiber as a public channel.

For other aspects of the QC protocol, the processor/FPGA (520) controls operations in concert with the trusted authority to record the quantum state and sending basis per pulse for the QC, transmit (in non-quantum communication with the trusted authority in a public channel) the recorded sending bases to the trusted authority, and otherwise process conventional QC protocol elements to determine the quantum keys. The processor/FPGA (520) can coordinate operations for privacy amplification and decoy states to further improve the security of QKD. Privacy amplification reduces the length of a shared bit string (e.g., by hashing with a hash function) to reduce partial information that an eavesdropper might have gained. The final length of the string can be set depending on the number of errors detected. For imperfect single-photon sources such as weak laser pulses, decoy states of different average photon numbers (brightness) can be transmitted so that the error rate and number of single photons in a bit string can be determined and used to regulate the degree of privacy amplification.

The memory (522) stores one or more keys that are produced based at least in part on the QC. For example, the memory (522) stores quantum keys produced in QKD between the QC card and the trusted authority. The memory (522) can also store other keys, such an initial pre-placed secret key used for authentication purposes. In some implementations, the memory (522) is secure memory in that the QC card (500) controls access to the memory (522), the keys are stored in encrypted form in the memory (522), and/or the memory (522) is resistant to physical tampering. The memory (522) can be fabricated along with the integrated optics modules (510) or separately placed within the QC card (500).

The power supply (580) provides power used to cool the laser, modulator and APD (517) to an operating temperature. When the QC card (500) draws electric power from a base station, the power supply (580) can be bypassed, and the electric power can also be used to recharge a battery (not shown) of the QC card (500).

The fiber optic connector (532) is optically coupled to the integrated optics modules (510) of the QC card. The fiber optic connector (532) conveys single-photon pulses for QC, bright pulses for QC control/tuning, and other pulses onto optical fiber for output. In other words, when the QC card (500) is coupled to a base station, the fiber optic connector (532) optically couples the integrated optics modules (510) to a fiber optic connection of the base station. Alternatively, the QC card (500) optically couples with the base station using free space transmission between the QC card (500) and the base station, and the QC card (500) includes a connector adapted for such free space transmission.

The electrical/mechanical connector (534) is electrically coupled to the power supply (580) and, in some cases, directly to integrated optics modules (510) or other modules of the QC card (500). The electrical/mechanical connector (534) is adapted to mechanically attach the QC card (500) to a base station and draw electric power from the base station. The electric power can be used to power one or more of the integrated optics modules (510), recharge a battery of the QC card, and/or cool one or more of the integrated optics modules (510) to an operating temperature. Alternatively, the electrical/mechanical connector (534) is separated into an electrical connector and a mechanical connector, or the electrical/mechanical connector (534) is combined with the fiber optic connector (532). The electrical connector can be adapted to draw power through a wired connection with the base station. Or, the electrical connector can be adapted to draw power through a wireless connection with the base station. For example, the QC card (500) includes a coil as part of its electrical connector, and a charging pad of the base station includes a corresponding coil to transfer power by electro-magnetic induction when the QC card (500) rests on the charging pad. In this case, for mechanical connection, the overall form of the QC card (500) can be adapted to fit within the charging pad. For use as a fillgun, the QC card (500) can include another connector (not shown) that is adapted to couple the QC card with another device for transmission of the one or more keys to the other device, or the fiber optic connector (532) can be used for such transmission.

The biometric reader (540) is a scanner or other module adapted to accept biometric indicia of a user. For example, the biometric reader (540) is a fingerprint scanner. The processor/FPGA (520) can include logic for encrypting the biometric indicia with a key stored in the secure memory (522). Or, one or more other encryption modules (not shown) can provide such encryption functionality.

The touch screen display (550) accepts user input (e.g., to a numeric keypad) that can be encrypted along with the biometric indicia as part of user authentication. The touch screen display (550) also displays information to the user (e.g., a count of quantum keys in memory (522), a prompt to contact the trusted authority to make quantum keys, a prompt to initiate secure communication with another, or a prompt for another function) and accepts user input to control the QC card (500). Alternatively, the QC card (500) includes another type of user input device and/or output device.

Outside of the integrated optics modules (510), most of the functional modules of the QC card (500) can be implemented with standard components for portable devices. Among the integrated optics modules (510), many of the modules (e.g., attenuator (514), monitor APD (517), splitter (516) and APD discriminator hybrid (518)) can be implemented with standard components for fiber optic communication. Other functional modules (e.g., FPGA) can be implemented with existing QKD control components that have been used with conventional QC transmitters to: (1) produce specific polarization states with a fiber-optic modulator; (2) regulate production of precisely timed QC and bright pulses in a known pattern disciplined with GPS (590) and an oscillator or atomic clock, for the trusted authority to track timing and time variations when performing QC; (3) monitor average photon number per pulse using the timing system and APD (517); (4) control APD bias, gating, and discriminator (518) electronics; (5) process conventional QC protocol control elements, e.g., to track, correct and exchange polarization state information. The integrated optics modules (510) can be implemented on a single substrate for low-cost manufacturing, or on separate substrates.

The QC card (500) shown in FIG. 5 includes modules that implement a QC transmitter. In alternative embodiments, a QC card includes modules that implement a QC receiver, and the computing device that implements the trusted authority includes modules for a QC transmitter. As part of communication over the optical fiber as the quantum channel, the QC card receives binary information for which modulation of quantum state is measured when producing the one or more keys. For example, the QC card includes a biometric reader, power supply, touch screen display and connectors as in the QC card (500) of FIG. 5. The QC card includes QC receiver modules for calibrating a filter to the narrow-frequency laser output of the QC transmitter, matching the pulse pattern for bright pulses and single-photon pulses from the QC transmitter, and synchronizing the gating of a photon detector for single-photon pulses for QC depending on pulse rate and clock phase, such that the single-photon detector is off when bright pulses are received and the bright pulses are optically switched to a multi-photon detector. Finally, the QC card also includes a processor/FPGA with protocol logic adapted for operation as a QC receiver (see the description of the FPGA for the trusted authority for details of operations).

The QC card (500) shown in FIG. 5 is adapted for communication over optical fiber. In alternative embodiments, a QC card is adapted for QC over free space with a trusted authority. For example, the QC card transmits photons through free space to a receiver terminal at a cell phone tower or other location. For this purpose, the QC card can couple with a base station that provides electric power to the QC card and aligns the QC card for transmission to the receiver terminal. The receiver terminal collects and guides photons from the QC card into an optical fiber that connects to a remote trusted authority, which may require complicated optics and suffer from loss of information. Alternatively, for purposes of QKD, the receiver terminal is a trusted intermediate node with equipment for QC reception and/or QC transmission. The receiver terminal and QC card generate quantum keys by QKD over free space. The receiver terminal and trusted authority also generate quantum keys by QKD over a fiber connection. The receiver terminal then uses a variation of a Leighton-Micali protocol or other protocol to convey randomly generated secret keys to the QC card (using the quantum keys from the QKD between the QC card and receiver terminal) and to the trusted authority (using the quantum keys from the QKD between the receiver terminal and trusted authority). The QC card and central trusted authority then store the secret keys for use.

2. Example Implementations of Integrated Optic Modules

FIGS. 6a-6c show example implementations (600, 601, 602) of integrated optics modules for a QC card. In the implementation (600) shown in FIG. 6a, a telecom laser (610) emits photons that are guided through the isolator (612) and coupling optics (614) to a waveguide or fiber (616). The waveguide or fiber (616) conveys the photons to an optical fiber (688) coupled to a fiber connector (690). A telecom detector (618) detects photons received through the fiber connector (690) as part of conventional optical communication.

A quantum laser (650) emits photons that are guided through the isolator (652) and coupling optics (654) to a waveguide (655). A switch (656) selectively engages the waveguide (655) with another waveguide that includes an attenuator (660), variable attenuator (662) and polarization controller (670). For example, the switch (656) can be implemented by changing the output port of a Mach-Zehnder interferometer. In this case, both of the switch outputs shown in FIG. 6a are actually the same output, but, when the switch (656) is thrown, the extinction ratio changes by about 27 dB. This causes a significant change in laser brightness with a quick, single step. More generally, the switch (656) acts as a variable attenuator.

The waveguide conveys the attenuated photon pulses to an optical fiber (688) coupled to a fiber connector (690). At the junction of multiple waveguides, the circulator (683) routes light from one waveguide to another waveguide depending on the direction of light propagation. Light from the fiber connector (690) is routed to the telecom detector (618), and light from the telecom laser (610) or quantum laser (650) is routed towards the fiber connector (690). The circulator (685) similarly routes light from fiber to fiber depending on the direction of light propagation.

Protocol logic (not shown) controls the variable attenuator (662) to yield single-photon pulses from the quantum laser (650). The protocol logic controls the polarization controller (670) to modulate the polarization state of the single-photon pulses and thereby encode bits of a random number for QC. For example, the quantum laser (650) operates at an appropriate telecom wavelength (such as 1310 nm or 1550 nm for fiber transmission), and the polarization controller (670) is a lithium niobate modulator. Alternatively, the quantum laser (650) operates at another suitable wavelength (such as 780 nm for free-space transmission) and/or the polarization controller (670) is a gallium arsenide (GaAs) modulator. For quantum state information being encoded in diagonal basis states and circular basis states, instead of a polarization modulator, a phase modulator can be used to change polarization from diagonal to left handedness, or to change polarization from anti-diagonal to right handedness. Finally, although FIG. 6a shows the quantum laser (650) separate from the polarization controller (670), the quantum laser (650) and polarization controller (670)/modulator can instead be more closely integrated, potentially with an amplitude modulator in the same module.

A photon detector (682) measures number of photons per pulse of the quantum laser (650). The protocol logic can use feedback from the photon detector (682) to control the variable attenuator (662). Another photon detector (684) can also be used for QC feedback purposes. For example, the first photon detector (682) is used for system calibration and normalization of the quantum laser (650) to interoperate with the telecom laser (610), and the second photon detector (684) is a single-photon detector used to evaluate whether pulses from the quantum laser (650) are single-photon pulses. In some implementations, the photon detectors (682, 684) are InGaAs detectors.

Thermo-electric cooling components (not shown) cool the lasers (610, 650) and photon detectors (682, 684) to an appropriate operating temperature.

FIG. 6a shows two lasers. Alternatively, the implementation (600) uses a single laser as both the telecom laser (610) and the quantum laser (650). If so, the attenuator (662) facilitates switching between single-photon pulses for operation as a quantum laser and bright pulses for operation as telecom laser. As shown in FIGS. 6b and 6c, additional variable attenuators can be added to facilitate such switching.

Many of the components are the same between the implementations (600, 601, 602) of FIGS. 6a-6c. Unless stated otherwise, for components with the same reference numerals in FIGS. 6a-6c, the foregoing description for FIG. 6a also applies for FIGS. 6b and 6c.

The implementation (601) in FIG. 6a lacks the switch (656) of FIG. 6b, but includes an additional variable attenuator (664) that can be used to effectively disengage the quantum laser (650). The implementation (602) of FIG. 6c also lacks the switch (656) and includes the additional variable attenuator (664). FIG. 6c shows another variation for routing and optics. The implementation (602) of FIG. 6c includes only waveguides (not optical fiber), and coupling optics (688) optically couple the waveguide (655) to the fiber connector (690). Instead of circulators (683, 685), the waveguides in the implementation (602) of FIG. 6c are shaped so that light is routed as desired.

3. Example Mobile Devices with QC Card

Figure 7:
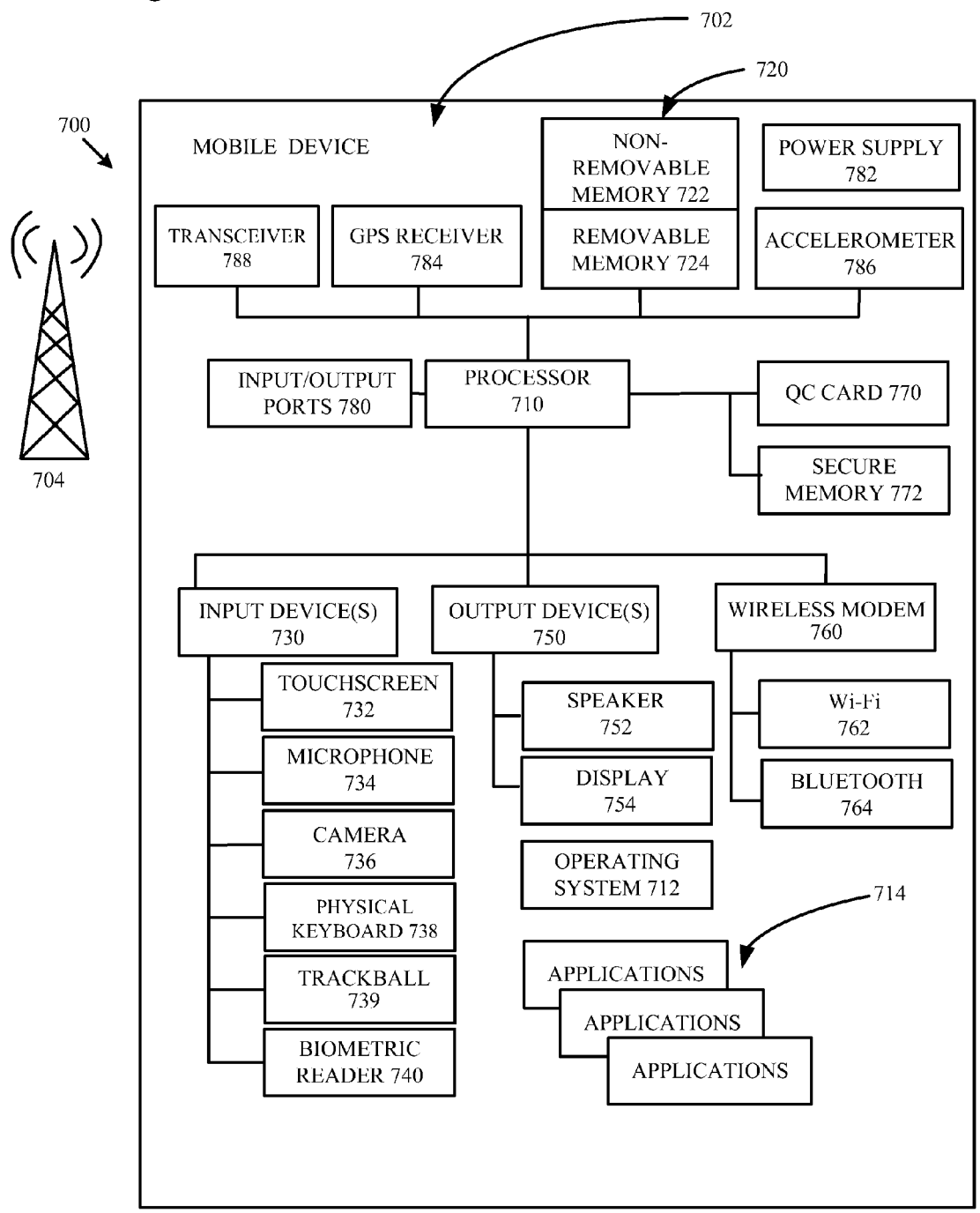
FIG. 7 is a block diagram of a mobile device that incorporates a QC card in some embodiments.

FIG. 7 is a system diagram depicting an exemplary mobile device (700) including a variety of optional hardware and software components, shown generally at (702). Any components (702) in the mobile device can communicate with any other component, although not all connections are shown, for ease of illustration. The mobile device can be any of a variety of computing devices (e.g., cell phone, smartphone, handheld computer, personal digital assistant, etc.) and can allow wireless two-way communications with one or more mobile communications networks (704), such as a cellular or satellite network.

In particular, the mobile device (700) includes a QC card (770) and secure memory (772) for storing quantum keys. For example, the QC card (770) is a variation of the QC card (500) described with reference to FIG. 5, where the mobile device (700) includes a touch screen display, biometric reader and GPS modules (instead of such components being included in the QC card (770)).

The illustrated mobile device can include a controller or processor (710) (e.g., signal processor, microprocessor, ASIC, or other control and processing logic circuitry) for performing such tasks as signal coding, data processing, input/output processing, power control, and/or other functions. An operating system (712) can control the allocation and usage of the components (702) and support for one or more application programs (714). The application programs can include common mobile computing applications (e.g., include email applications, calendars, contact managers, web browsers, messaging applications), or any other computing application. In some scenarios, an application program uses one or more of the quantum keys stored in the secure memory (772) to encrypt and/or decrypt information that is communicated with the mobile device (700).

The illustrated mobile device can include memory (720). Memory (720) can include non-removable memory (722) and/or removable memory (724). The non-removable memory (722) can include RAM, ROM, flash memory, a disk drive, or other well-known memory storage technologies. The removable memory (724) can include flash memory or a Subscriber Identity Module card, which is well known in GSM communication systems, or other well-known memory storage technologies. The memory (720) can be used for storing data and/or code for running the operating system (712) and the applications (714). Example data can include web pages, text, images, sound files, video data, or other data sets to be sent to and/or received from one or more network servers or other mobile devices via one or more wired or wireless networks.

The mobile device can support one or more input devices (730), such as a touch screen (732), microphone (734), camera (736), physical keyboard (738) and/or trackball (739) and one or more output devices (750), such as a speaker (752) and a display (754). The touch screen (732) and/or camera (736) can provide rudimentary functionality for a biometric reader, or the mobile device (700) can include a dedicated biometric reader (740). Other possible output devices (not shown) can include a piezoelectric or other haptic output device. Some devices can serve more than one input/output function. For example, touch screen (732) and display (754) can be combined in a single input/output device.

A wireless modem (760) can be coupled to an antenna (not shown) and can support two-way communications between the processor (710) and external devices, as is well understood in the art. The modem (760) is shown generically and can include a cellular modem for communicating with the mobile communication network (704) and/or other radio-based modems (e.g., Bluetooth or Wi-Fi). The wireless modem (760) is typically configured for communication with one or more cellular networks, such as a GSM network for data and voice communications within a single cellular network, between cellular networks, or between the mobile device and a public switched telephone network.

The mobile device can further include at least one input/output port (780), a power supply (782), a satellite navigation system receiver (784) such as a global positioning system receiver, an accelerometer (786), a transceiver (788) (for wirelessly transmitting analog or digital signals) and/or a physical connector, which can be a USB port, IEEE 1394 (firewall) port, and/or RS-232 port. The illustrated components (702) are not required or all-inclusive, as components can be deleted and other components can be added. A quantum key stored in the secure memory (772) can be used to encrypt and/or decrypt information transmitted or received in non-quantum communication over a public channel using the modem (760), port (780), transceiver (788) or physical connector.

C. Example Base Stations

Figure 8:
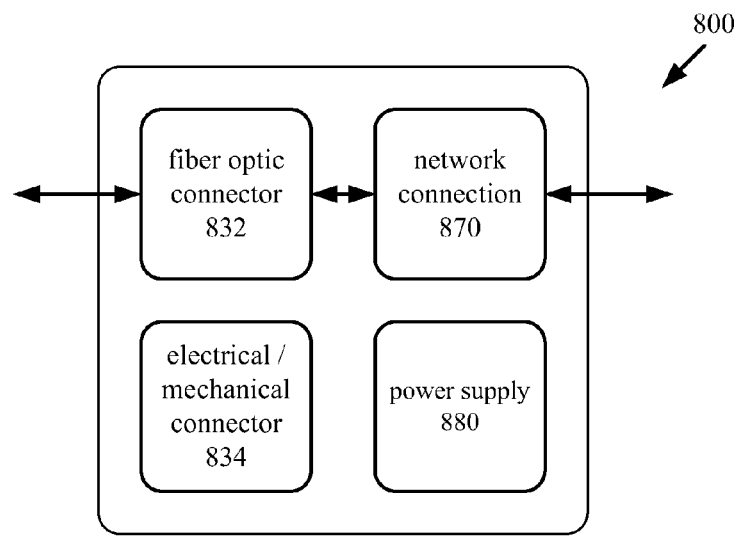
FIG. 8 is a block diagram of a generalized base station for a QC card.

FIG. 8 shows a generalized base station (800) that is adapted to couple with a QC card such as the QC card (500) explained with reference to FIG. 5. The base station (800) shown in FIG. 8 is a "dumb" terminal that includes basic components for optically and electrically coupling to a QC card and providing a network connection for QC with a trusted authority.

The base station (800) includes a network connection (870) for conveying information in a quantum channel as part of QC between the QC card and the trusted authority through the base station. For example, the network connection (870) uses a non-dedicated optical fiber for the QC in the quantum channel, and the network connection (870) also uses the non-dedicated optical fiber for non-quantum communication in a public channel between the QC card and the trusted authority. Alternatively, the network connection (870) uses another type of optical connection to the trusted authority.

The base station (800) includes a connector adapted to couple with the QC card for QC between the QC card and the trusted authority. In particular, the base station (800) includes a fiber optic connector (832) that is adapted to optically couple the QC card with the network connection (870) of the base station (800) when the QC card is coupled to the base station (800). Alternatively, the QC card optically couples with the base station (800) using free space transmission between the QC card and the base station (800), and the base station (800) includes a connector adapted for such free space transmission.

The base station (800) also includes an electrical/mechanical connector (834) that mechanically attaches the QC card to the base station (800). The connector (834) also supplies electric power through the power supply (880) to the QC card when the QC card is coupled to the base station (800). Although FIG. 8 shows the electrical connector and mechanical connector together as a single connector (834) apart from the fiber optic connector (832), the electrical connector, fiber optic connector and mechanical connector can instead be separated into three connectors or combined into a single connector. The electrical connector can be adapted to supply power through a wired connection to the QC card. Or, the electrical connector can be adapted to supply power through a wireless connection to the QC card. For example, the QC card includes a coil, and a charging pad of the base station (800) includes a corresponding coil as part of its electrical connector to transfer power by electromagnetic induction when the QC card rests on the charging pad. In this case, for mechanical connection, the overall form of the base station (800) can be adapted so that the QC card fits within the charging pad.

In implementations in which the base station (800) is a "dumb" terminal, the base station (800) provides a fiber connection to the trusted authority and provides electric power to the QC card (e.g., for powering the QC card, recharging a battery of the QC card), which gives the base station a simple and inexpensive design. The base station need not provide security features, since system security is provided by the QC card and the trusted authority.

In alternative embodiments, the base station is a trusted terminal or partially trusted terminal that includes components that provide additional functionality for QKD between a trusted authority and QC card coupled with the base station. As a trusted terminal, a base station performs QKD with the trusted authority and uploads keys to a QC card when a user has been authenticated by a trusted authority using the QC card. The QC card can be much smaller and less expensive, since it no longer has QC components.

As a partially trusted terminal, a base station provides services such as photon level monitoring, timing control, etc. For example, the base station includes a photon detector adapted to monitor number of photons per pulse and programmable logic that is configured to control the timing and pattern of pulses produced by a laser for the QC. The programmable logic can also be configured to control pulses produced by another laser for timing, non-quantum communication, and/or other purposes. A QC card couples to the partially trusted base station to enable QC transmission, but the QC card can be smaller and less expensive than a QC card adapted to couple to a dumb terminal. The QC card is less secure in the partially trusted terminal model, however. An adversary with access to the partially trusted base station can make it cause the QC card to send photon pulses that are more susceptible to interception or eavesdropping.

D. Example Trusted Authority Adapted for QKD with QC Card

Figure 9:
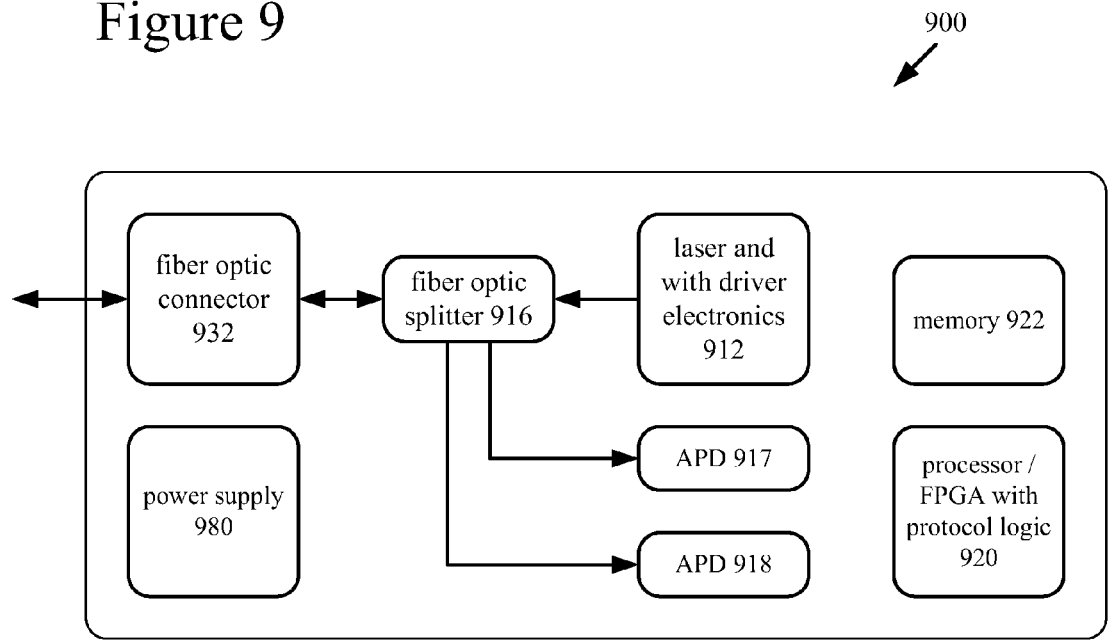
FIG. 9 is a block diagram of a generalized trusted authority adapted to QKD with a QC card.

FIG. 9 shows a generalized computing system (900) that implements a trusted authority adapted for QKD with a QC card. At a high level, the computing system (900) includes a connector, optics modules, power supply (980) and memory for storing quantum keys.

In FIG. 9, the optics modules are adapted for communication over non-dedicated optical fiber. For QC over the optical fiber as a quantum channel, the optics modules measure modulation of the quantum state of binary information received from a QC transmitter of a QC card coupled to a base station. The optics modules also provide a network transceiver adapted to transmit and receive information in a public channel over the optical fiber.

The fiber optic connector (932) optically couples the optics modules of the computing system (900) to a fiber optic connection. The connector (932) conveys single-photon pulses for QC, bright pulses for QC control/tuning, and other pulses received over optical fiber to a fiber splitter (916) or splitters. (Although FIG. 9 shows a simple splitter (916), the splitter can implement sophisticated routing and gating logic as described below with reference to the processor/FPGA (920).) Single-photon pulses for QC are received by an APD (917), and a polarimeter measures quantum state of the single-photon pulses. Other pulses (e.g., bright pulses for timing, synchronization, tuning, conventional fiber optic communication, etc.) are received by another APD (918) or other detector (not shown) for conventional fiber optic reception.

The laser and driver electronics (912) produces pulses as a conventional transmitter. With the laser, the computing system (900) transmits information (e.g., information about measuring bases in QKD, other QKD protocol information, non-secret key information from the trusted authority) in non-quantum communication over the optical fiber as a public channel.

The processor/FPGA (920) with protocol logic controls operations for user authentication. For example, when an encrypted message for user authentication is received from the QC card by conventional transmission over the optical fiber as a public channel, the processor/FPGA (920) determines a previously stored key in memory (922) and decrypts the message using the key. The processor/FPGA (920) analyzes the contents of the message (e.g., comparing the contents to stored biometric indicia, PIN, other identifying information, etc. for the user) and, if appropriate, authenticates the user.

The processor/FPGA (920) also controls operations for the QC protocol to produce quantum keys with the QC card coupled to the base station, and then store the quantum keys in association with the user in the memory (922). For example, the processor/FPGA (920) controls a polarimeter to measure the quantum state per pulse for QC and records the measured quantum state and measuring basis. After QC transmission/reception, the processor/FPGA (920) controls exchange of information in non-quantum communication with the QC card over the optical fiber, transmitting the recorded measuring bases and receiving QC protocol control elements from the QC card. The processor/FPGA processes the QC protocol control elements to determine the quantum keys.

More specifically, to enable QC reception and conventional transceiver functions, the processor/FPGA (920) controls the optics modules according timing and pattern of single-photon pulses produced for the QC and to bright pulses produced for timing and/or the non-quantum communication. For example, the processor/FPGA (920) calibrates a filter to the narrow-frequency laser output of the QC transmitter, matches the pulse pattern for bright pulses and single-photon pulses from the QC transmitter, and synchronizes the gating of a photon detector for single-photon pulses for QC depending on pulse rate and clock phase, such that the single-photon detector is off when bright pulses are received and the bright pulses are optically switched to a multi-photon detector.

The processor/FPGA (920) can also control operations for a secure multi-party communication protocol that uses quantum keys. For example, the processor/FPGA (920) controls operations to generate and encrypt session keys with stored quantum keys, or distribute non-secret material, to devices that have quantum keys from prior QKD with the trusted authority.

The memory (922) stores one or more keys that are produced based at least in part on the QC. For example, the memory (922) stores quantum keys produced in QKD between the QC card and the trusted authority. The memory (922) potentially stores quantum keys for multiple user devices, indexed by user. The memory (922) can also store other keys, such an initial pre-placed secret key used for authentication purposes for a give user. In some implementations, the memory (922) is secure memory in that the computing system (900) controls access to the memory (922), the keys are stored in encrypted form in the memory (922), and/or the memory (922) is resistant to physical tampering.

The computing system (900) shown in FIG. 9 includes modules that implement a QC receiver. In alternative embodiments, a computing system for the trusted authority includes modules that implement a QC transmitter. The QC transmitter transmits information in a quantum channel as part of QC with a QC card that is coupled to a base station. For example, the computing system for the trusted authority includes a conventional QC transmitter.

The computing system (900) shown in FIG. 9 is adapted for communication over optical fiber. In alternative embodiments, a computing system that implements a trusted authority is adapted for QC over free space with a QC card.

E. Example Uses of Optical Fiber for QC and Non-QC

Figure 10:
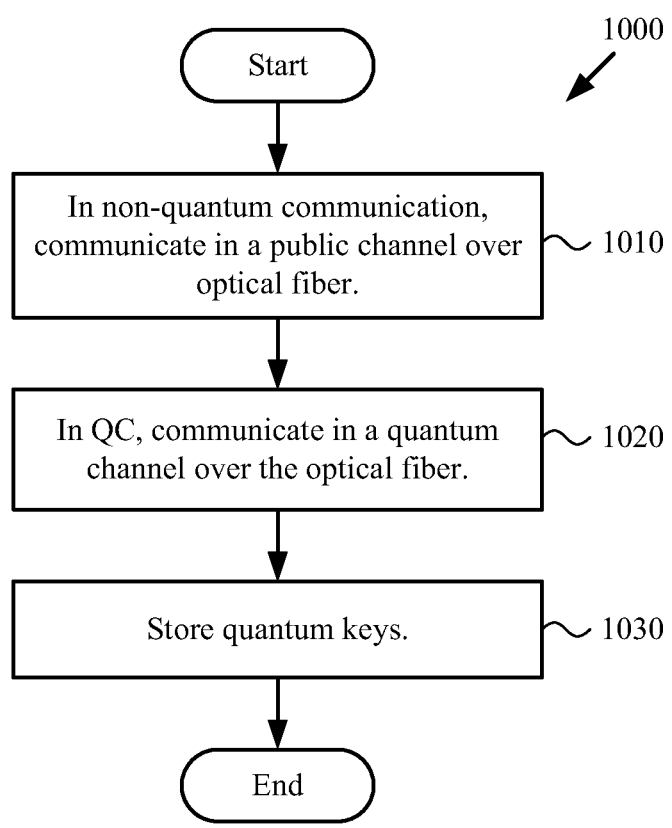
FIG. 10 is a flowchart illustrating use of the same optical fiber as a quantum channel and public channel.

FIG. 10 shows a generalized technique (1000) for using the same optical fiber for both QC and non-quantum communication. A first device performs the technique (1000) in communication with a second device. For example, the first device is a QC card, and the second device is a computing system that implements a trusted authority. Alternatively, the roles are switched—the first device is a computing system that implements a trusted authority, and the second device is a QC card.

In non-quantum communication with a second device, the first device communicates (1010) in a public channel over optical fiber. In QC with the second device, the first device also communicates (1020) in a quantum channel over the optical fiber. The information content in the quantum channel is encoded in quantum states (e.g., polarization states of single-photon pulses). The information content in the public channel is encoded conventional non-quantum techniques for network communication over optical fiber. The first device and second device produce one or more keys, for example, through QKD according to a QC protocol. The first device then stores one or more of the resulting keys.

When the first device is a QC card with a miniaturized QC transmitter and the second device is a computing system that implements the trusted authority, the QC card transmits and receives information in the public channel, and the QC card transmits information in the quantum channel for QC with the trusted authority. For example, for the non-quantum communication in the public channel over the optical fiber, (1) before the QC begins, the QC card transmits encrypted identification information for a user of the QC card to the trusted authority for authentication; (2) after the QC but before the one or more keys are finalized, the QC card transmits and receives QC protocol elements to/from the trusted authority; and (3) after the one or more keys are finalized, the QC card receives information that is usable with at least one key it stores.

On the other hand, when the first device is a computing system that implements the trusted authority and the second device is a QC card with a miniaturized QC transmitter, the computing system that implements the trusted authority transmits and receives information in the public channel, and the computing system receives information in the quantum channel for QC with the QC card. For example, for the non-quantum communication in the public channel over the optical fiber, the computing system that implements the trusted authority: (1) before the QC begins, receives encrypted identification information for a user of the QC card for authentication; (2) after the QC but before the one or more keys are finalized, transmits and receives QC protocol elements to/from the QC card; and (3) after the one or more keys are finalized, transmits information that is usable with at least one key is stores.

III. Secure Multi-Party Communication after Quantum Key Distribution

Establishing shared secret session keys is a primary objective of secure communications. Use of the shared secret session keys enables users to achieve confidentiality and verify authenticity for their messages. Multiple protocols (e.g., Needham-Schroeder and Shoup-Rubin) provide ways to establish shared secret session keys for a secure communications network of N users. In such protocols, each user has a secret pre-placed long-term key that is shared with a trusted authority. Pairs of users derive key encryption keys algorithmically from their long-term keys through additional communication with the trusted authority. The key encryption keys are then used to establish secret session keys between pairs of users.

Secure distribution of long term keys can be problematic. In practice, long-term keys can be distributed out-of-band, by courier, or by having each user bring his or her device into physical proximity of the trusted authority for direct delivery of the long-term key. Such methods of distributing long-term keys are cumbersome and susceptible to compromise. Alternatively, public key cryptography could be used for distribution of long-term keys, but public key cryptography is susceptible to archival attack.

Moreover, aside from distribution of long-term keys, because key encryption keys are derived algorithmically from long term keys, these protocols lack forward security. If a long-term key is compromised, or if the cryptographic algorithm used to derive key encryption keys from long-term keys is broken, the secrecy of subsequent keys is not assured since the subsequent keys can be predicted from known previous keys.

Protocols described below use QKD to provide keys to users. Pre-placement of long-term keys out-of-band, by courier, by public key cryptography or by delivery in close physical proximity is not required. Instead, each user has a pre-placed short-term authentication key that is shared with the trusted authority. The short-term authentication key is used to authenticate the user in the first QKD session between the user and the trusted authority. After the first QKD session has been completed, the short-term authentication key need no longer be kept secret—it can be replaced with a small portion of the shared secret bits produced in the first QKD session to form a new authentication key. The new authentication key is used for authentication of the user at the beginning of the next QKD session, replaced with another authentication key, and so on.

The rest of the shared secret bits produced in QKD sessions take the roles of long-term keys and key encryption keys in the conventional protocols. These keys are termed encryption keys, and the encryption keys can be used to create secure session keys for encryption/decryption of messages between users. The encryption keys have no algorithmic heritage from the authentication keys, since the encryption keys are randomly produced bits. Through additional, on-demand QKD sessions, the encryption keys can be frequently and flexibly updated with strong forward security. Moreover, the QCs in QKD sessions are not susceptible to passive monitoring or tapping, so the encryption keys and the fresh authentication keys are immune to archival attack.

In summary, compared to conventional protocols, users need not protect long-term secret keys since fresh authentication keys are generated in QKD. Encryption keys (and shared session keys exchanged using encryption keys) can be frequently replaced with strong forward security. Due to the strong forward security and increased turnover in use/replacement of authentication keys and encryption keys, the volume of data at risk to security breaches is much reduced when compared to data at risk from compromise of a long-term key or key-encryption key in the conventional protocols.

The described techniques and tools for secure multi-party communication after QKD can be performed with user devices that include QC cards and/or with user devices that receive keys from QC cards. In addition, the described techniques and tools can be performed with other user devices, e.g., devices that acquire keys through conventional QKD with a trusted authority.

A. Example Protocols for QKD Between Trusted Authority and Users

FIG. 11 illustrates a generalized example protocol (1100) including QKD between a trusted authority and one or more user devices to establish keys for secure multi-party communication. Through the protocol (1100), each of multiple users performs point-to-point QKD with a trusted authority to establish keys with forward secrecy. The trusted authority also provides each user with a non-secret look-up table from which the keys of other users can be derived. User-to-user QKD is not required, yet many of the benefits and advantages of QKD are retained in user-to-user communication.

FIG. 11 details operations between a first user device ("user device 1") and the trusted authority. The authentication and QKD operations are repeated between the trusted authority and each of N user devices i, for $1 \leq i \leq N$. Alternatively, the trusted authority establishes keys with a device that acts as a fillgun, eventually distributing the keys to a user device for secure multi-party communication with one or more other user devices. Without loss of generality, for the sake of presentation, the operations of the protocol (1100) are described with reference to a user device.

The first user device receives biometric indicia B for the user. For example, the biometric indicia are fingerprint scan data. Instead of or in addition to the biometric indicia, the user device can accept and encrypt keystroke input for a personal identification number.

The first user device encrypts the biometric indicia B using an encryption algorithm E[a; b]. For example, the first user device uses a short pre-placed authentication key $AK_0$(1) for the first session of QKD with the trusted authority. The encryption algorithm E[a; b] can be a symmetric key encryption algorithm of information a with key b, such as AES (see FIPS 197 "The Advanced Encryption Standard (AES)") or another encryption algorithm. Generally, the encrypted authentication information is sent over a non-secure network such as a public network.

The trusted authority receives the encrypted authentication information and decrypts it using the appropriate algorithm (e.g., symmetric key encryption algorithm) and pre-placed authentication key $AK_0$(1) of the first user device. The trusted authority compares the received authentication information with previously provided identification information for the first user and, if appropriate, authenticates the user.

Assuming the user has been authenticated, the first user device and trusted authority perform QKD to generate a secret random bit sequence that is parsed into keys. For example, the user device and trusted authority generate N−1 secret independent encryption keys and N−1 secret independent key derivation keys, which are shared by the user device and the trusted authority, and which are stored in secure memory at trusted authority and user device. In example implementations, the shared bit series is parsed into the following keys by both the trusted authority and user device i:

N−1 encryption keys K(i,j) for $j \neq i$,
N−1 key derivation keys L(i,j) for $j \neq i$,
a key authentication key M(i) and
a fresh authentication key $AK_x$(i).

The encryption keys K(i,j), key derivation keys L(i,j), and key authentication key M(i) can have 256 bits per key or some other number of bits per key. FIG. 11 shows distribution of shared encryption keys K(1, j), derivation keys L(1, j), a key authentication key M(1) and a fresh authentication key $AK_1$(1) for the first user device. The encryption keys K(1, j), key derivation keys L(1, j) and key authentication key M(1) are used as described below. The initial authentication key $AK_0$(1) of the first user device no longer needs to be kept secret. It is replaced with a fresh authentication key $AK_1$(1) produced in the QKD, for use in authenticating the user in a future QKD session with the trusted authority.

In contrast to conventional approaches that require placement of long-term keys out-of-band, by courier or by close physical proximity, starting from a short pre-placed secret authentication key $AK_0(i)$, QKD provides an essentially unconstrained ability to generate new secret bit strings shared by the trusted authority and user i. In addition, the new secret bit strings for $K(i,j)$, $L(i,j)$, $M(i)$ and $AK_x(i)$ have no algorithmic dependence on the pre-placed authentication key $AK_0(i)$.

According to the protocol (1100) shown in FIG. 11, the trusted authority repeats the authentication and QKD for each of one or more other user devices. Thus, using his or here pre-placed authentication key $AK_0(i)$, each user i, for $1 \leq i \leq N$, establishes a QKD session with the trusted authority and establishes shared keys with the trusted authority.

Following QKD with the N user devices, the trusted authority stores the encryption keys $K(i,j)$, key derivation keys $L(i,j)$, and key authentication key $M(i)$ for the N user devices, and each of the N user devices i stores the encryption keys $K(i,j)$, key derivation keys $L(i,j)$, and key authentication key $M(i)$ for that user device i. Typically, the keys are stored in secure memory. For example, if there are five user devices, the trusted authority stores encryption keys and key derivation keys as follows.

| K(i,j) | i = 1 | i = 2 | i = 3 | i = 4 | i = 5 |
|---|---|---|---|---|---|
| j = 1 | — | $k_{2,1}$ | $k_{3,1}$ | $k_{4,1}$ | $k_{5,1}$ |
| j = 2 | $k_{1,2}$ | — | $k_{3,2}$ | $k_{4,2}$ | $k_{5,2}$ |
| j = 3 | $k_{1,3}$ | $k_{2,3}$ | — | $k_{4,3}$ | $k_{5,3}$ |
| j = 4 | $k_{1,4}$ | $k_{2,4}$ | $k_{3,4}$ | — | $k_{5,4}$ |
| j = 5 | $k_{1,5}$ | $k_{2,5}$ | $k_{3,5}$ | $k_{4,5}$ | — |

| L(i,j) | i = 1 | i = 2 | i = 3 | i = 4 | i = 5 |
|---|---|---|---|---|---|
| j = 1 | — | $l_{2,1}$ | $l_{3,1}$ | $l_{4,1}$ | $l_{5,1}$ |
| j = 2 | $l_{1,2}$ | — | $l_{3,2}$ | $l_{4,2}$ | $l_{5,2}$ |
| j = 3 | $l_{1,3}$ | $l_{2,3}$ | — | $l_{4,3}$ | $l_{5,3}$ |
| j = 4 | $l_{1,4}$ | $l_{2,4}$ | $l_{3,4}$ | — | $l_{5,4}$ |
| j = 5 | $l_{1,5}$ | $l_{2,5}$ | $l_{3,4}$ | $l_{4,5}$ | — |

And each user device i stores the encryption keys and key derivation keys from one of the columns of the tables.

Returning to FIG. 11, the trusted authority determines pair keys $P(i,j)$ and key authentication values $A(i,j)$. Each of the pair keys and each of the key authentication values is specific to pair-wise communication between a user device i and user device j. In the example implementations, the trusted authority computes the keys $P(i,j)$ and key authentication values $A(i,j)$ as follows:

$$P(i,j) = L(i,j) \oplus K(j,i) \text{ for } 1 \leq i,j \leq N, \text{ and } i \neq j,$$

$$A(i,j) = H[K(j,i); M(i)] \text{ for } 1 \leq i,j \leq N, \text{ and } i \neq j,$$

where $\oplus$ indicates a bitwise XOR operation, and $H[a; b]$ indicates a keyed hash function of input a with key b. For example, the keyed hash function $H[a; b]$ is a keyed cryptographic hash function such as HMAC-SHA-256 (see FIPS 198 "The Keyed-Hash Message Authentication Code (HMAC)") or other keyed hash function. The pair keys and key authentication values can each have 256 bits or some other number of bits. The trusted authority can organize the pair keys and key authentication values as two look-up tables or with other data structures. For example, if there are five user devices, the trusted authority determines pair keys and key authentication values as follows from the encryption keys and key derivation keys shown above.

| P(i,j) | i = 1 | i = 2 | i = 3 | i = 4 | i = 5 |
|---|---|---|---|---|---|
| j = 1 | — | $l_{2,1} \oplus k_{1,2}$ | $l_{3,1} \oplus k_{1,3}$ | $l_{4,1} \oplus k_{1,4}$ | $l_{5,1} \oplus k_{1,5}$ |
| j = 2 | $l_{1,2} \oplus k_{2,1}$ | — | $l_{3,2} \oplus k_{2,3}$ | $l_{4,2} \oplus k_{2,4}$ | $l_{5,2} \oplus k_{2,5}$ |
| j = 3 | $l_{1,3} \oplus k_{3,1}$ | $l_{2,3} \oplus k_{3,2}$ | — | $l_{4,3} \oplus k_{3,4}$ | $l_{5,3} \oplus k_{3,5}$ |
| j = 4 | $l_{1,4} \oplus k_{4,1}$ | $l_{2,4} \oplus k_{4,2}$ | $l_{3,4} \oplus k_{4,3}$ | — | $l_{5,4} \oplus k_{4,5}$ |
| j = 5 | $l_{1,5} \oplus k_{5,1}$ | $l_{2,5} \oplus k_{5,2}$ | $l_{3,5} \oplus k_{5,3}$ | $l_{4,5} \oplus k_{5,4}$ | — |

| A(i,j) | i = 1 | i = 2 | i = 3 | i = 4 | i = 5 |
|---|---|---|---|---|---|
| j = 1 | — | $H[k_{1,2}; M(2)]$ | $H[k_{1,3}; M(3)]$ | $H[k_{1,4}; M(4)]$ | $H[k_{1,5}; M(5)]$ |
| j = 2 | $H[k_{2,1}; M(1)]$ | — | $H[k_{2,3}; M(3)]$ | $H[k_{2,4}; M(4)]$ | $H[k_{2,5}; M(5)]$ |
| j = 3 | $H[k_{3,1}; M(1)]$ | $H[k_{3,2}; M(2)]$ | — | $H[k_{3,4}; M(4)]$ | $H[k_{3,5}; M(5)]$ |
| j = 4 | $H[k_{4,1}; M(1)]$ | $H[k_{4,2}; M(2)]$ | $H[k_{4,3}; M(3)]$ | — | $H[k_{4,5}; M(5)]$ |
| j = 5 | $H[k_{5,1}; M(1)]$ | $H[k_{5,2}; M(2)]$ | $H[k_{5,3}; M(3)]$ | $H[k_{5,4}; M(4)]$ | — |

The pair keys $P(i,j)$ and key authentication values $A(i,j)$ need not be kept secret. Generally, the trusted authority makes the pair keys $P(i,j)$ and key authentication values $A(i,j)$ available for distribution to the respective user devices over a non-secure network such as a public network. A given user device i retrieves the pair keys $P(i,j)$ and key authentication values $A(i,j)$ that it uses. For example, the first user device of FIG. 11 retrieves the pair keys $P(1, j)$ and key authentication values $A(1, j)$ specific to the first user device. The user devices can retrieve and store the pair keys and key authentication values for use during later communication between user devices even if the trusted authority is off-line. Or, if the trusted authority is online during later communication between user devices, a user device i can retrieve the pair keys and key authentication values for the device i at the time of communication, or it can retrieve only the key and authentication value specific to communication from user device i to user device j from the online trusted authority.

As explained below, from his key derivation key $L(i,j)$ and from a pair key $P(i,j)$ provided by the trusted authority, a user device i can derive the encryption key $K(j,i)$ that another user device j uses in communication with the user device i. From his key authentication key $M(i)$ and the key authentication value $A(i,j)$ provided by the trusted authority, the user device i can verify that the encryption key $K(j,i)$ is authentic. The user device j can similarly derive and authenticate the encryption key $K(i,j)$ of the user device i. Using one or both of the encryption keys, the two user devices can establish one or more shared secret session keys for communications between them.

Because the encryption keys and key derivation keys are generated by QKD, they are independent and do not depend on any pre-placed secret. As such, the protocol (1100) shown in FIG. 11 provides strong forward security that is superior to conventional protocols for multi-party communication. Furthermore, fresh encryption keys and key derivation keys can be generated in future QKD sessions between user devices and the trusted authority. Moreover, additional users can be added to the communication network by the trusted authority. For this purpose, the trusted authority can assign extra encryption keys and key derivation keys for a given user device i for use with to-be-determined new user devices, distribute encryption keys and key derivation keys by QKD with a new user device when the new user device is added, and update the pair keys and key authentication values for distribution.

B. Example Protocols for Secure Communication Between Users

In the example implementations, for a user device i to establish secure communication with a user device j, the user device i uses its key derivation key L(i,j) and the pair key P(i,j) to derive the encryption key K(j,i) of the user device j. The user device i computes the encryption key K(j,i) as follows.

$$K(j,i)=L(i,j)\oplus P(i,j).$$

For example, suppose the first user device (i=1) tries to establish secure communication with a fourth user device (i=4). The first user device derives the encryption key K(4,1) from the key derivation key L(1,4) and the pair key P(1,4). With the example keys shown in the tables above, the key derivation key L(1,4) is $l_{1,4}$, and the pair key P(1,4) is $l_{1,4}\oplus k_{4,1}$. The first user device computes the encryption key K(4,1) as follows.

$$K(4,1)=l_{1,4}\oplus(l_{1,4}\oplus k_{4,1}).$$

The result of the operation is $k_{4,1}$, which is K(4,1).

The user device i can authenticate the encryption key K(j,i) derived for the user device j. For example, the user device i computes a check value from its key authentication key M(i) and the encryption key K(j,i):

$$\text{check\_value}=H[K(j,i);M(i)]$$

where H[a; b] indicates the keyed hash function also used by the trusted authority. The user device i then matches the check value against the reference authentication value A(i,j) provided by the trusted authority to the user device i. If the values match, the encryption key K(j,i) is authentic. For example, for the first user device (i=1) to authenticate the encryption key K(4,1), the first device computes the check value H[K(4,1); M(1)]. With the example keys shown in the tables above, the key encryption key K(4,1) is $k_{4,1}$, and the key authentication value A(1,4) is $H[k_{4,1}; M(1)]$. The first user device computes check_value=$H[k_{4,1}; M(1)]$ and compares the check value to the reference value A(1,4).

The user devices i and j then use one or more of the encryption keys for secure communication between the user devices i and j. Typically, the secure communication happens over a non-secure network such as a public network. FIGS. 12a and 12b illustrate two alternative modes of operation for user devices i and j to use encryption keys. In FIGS. 12a and 12b, the two user devices are a first user device (i=1) and fourth user device (i=4)

FIG. 12a shows how two user devices use encryption keys to establish secure communication according to a first mode of operation (1200). In the first mode of operation (1200), the first user device derives and authenticates the encryption key K(4,1) of the fourth user device. The fourth user device similarly derives and authenticates the encryption key K(1, 4) of the first user device. More generally, user device i derives and authenticates the encryption key K(j,i) of user device j, and user device j derives and authenticates the encryption key K(i,j) of user device i.

In FIG. 12a, the first user device uses the encryption key K(4,1) to encrypt messages to the fourth user device, which uses the encryption key K(4,1) to decrypt the messages. The fourth user device uses the encryption key K(1,4) to encrypt messages to the first user device, which uses the encryption key K(1,4) to decrypt the messages. Alternatively, the roles of the encryption keys are swapped between the first user device and fourth user device (i.e., the first user device uses the key K(1,4) for encryption of outgoing messages, and the fourth user device uses the key K(4,1) for encryption of outgoing messages). Different keys are still used when sending a message to a user device and receiving a message from that user device. As another alternative, both user devices use only one of the encryption keys for both encryption and decryption (e.g., the first user device and fourth user device use only the encryption key K(4,1)), which means the fourth user device need not derive the encryption key K(1,4)). The encryption key used can depend on which user device initiates the communication session. In any case, in the first mode of operation (1200), the user devices directly use one or more encryption keys as session key(s) to encrypt/decrypt messages.

The first user device and fourth user device use an encryption algorithm E[a; b], which can be a symmetric key encryption algorithm such as AES or other encryption algorithm. The encryption algorithm can be the same as the encryption algorithm used to exchange authentication information before QKD, or it can be a different encryption algorithm.

One issue with the first mode of operation (1200) is reuse of the encryption keys K(i,j) in different sessions between the user devices i and j. (Reuse of the encryption keys K(i,j) makes the communication susceptible to conventional attacks on the encryption algorithm E[a; b].) To address this issue, if the trusted authority is online (such as in a transparent fiber network), before each communication session the user devices i and j can generate new encryption keys and key derivation keys with forward security. This reduces the amount of data encrypted with any given key.

On the other hand, if the trusted authority is offline (such as when one of the user devices is a satellite, or when keys are provided from the trusted authority to a QC card), the encryption keys and key derivation keys can be replaced less frequently. Thus, rather than distributing a single key K(i,j) and single key L(i,j) specific to user devices i and j in a given QKD session, the trusted authority distributes multiple encryption keys key K(i,j) and multiple encryption keys L(i,j) specific to user devices i and j. For example, the first user device of FIG. 12a receives multiple encryption keys K(1,4), multiple key derivation keys L(1,4), and multiple corresponding pair keys P(1,4). The multiple keys can be used for multiple different communication sessions between the user devices i and j, or they can be used according to an established pattern within a single communication session (e.g., use for x minutes or x bytes of information). Again, this reduces the amount of data encrypted with any given key.

FIG. 12b shows how two user devices use encryption keys to establish secure communication according to a second mode of operation (1250). In FIG. 12b, the first user device initiates the communication session. The first user device derives and authenticates the encryption key K(4,1) of the fourth user device. The first user device generates a session key S(1,4) and encrypts the session key S(1,4) using the derived encryption key K(4,1) of the fourth user device.

More generally, user device i derives and authenticates the encryption key K(j,i) of user device j, generates a session key S(i,j), and encrypts the session key S(i,j) using the encryption key K(j,i) of user device j:

$$E[S(i,j);K(j,i)].$$

The encryption algorithm E[a; b] can be a symmetric key encryption algorithm such as AES or other encryption algorithm. The encryption algorithm can be the same as the encryption algorithm used to exchange authentication information before QKD, or it can be a different encryption algorithm.

The user device j receives the encrypted session key and decrypts it using the encryption key K(j,i), with the assurance that the session key came from user device i using the encryption key K(j,i) of user device j. In FIG. 12b, the fourth user device receives the encrypted session key E[S(1,4); K(4,1)] and decrypts it using the encryption key K(4,1). Alternatively, the user device j initiates the communication, and the roles of the user device i and user device j are switched in the second mode of operation (1250). Or, the user device i that initiates the communication session uses its encryption key K(i,j) to encrypt the session key, and the other user device j derives the key K(i,j) to recover the session key.

In any case, the two user devices i and j use a shared session key to encrypt and decrypt message in secure communication between the two user devices. In FIG. 12b, the first user device and fourth user device use the session key S(1,4) to encrypt and decrypt messages between the two user devices. For a future communication session, or to switch the session key after a defined period in the first communication session, the two user devices i and j can establish a new shared session key. Relative to the first mode of operation (1200), the second mode of operation (1250) greatly reduces the amount of data encrypted with a given encryption key, since only session keys are encrypted. As such, the second mode of operation (1250) is useful in scenarios in which user devices cannot frequently perform QKD with the trusted authority to replace their encryption keys and key derivation keys. In contrast to the first mode of operation (1200), however, if an encryption key becomes compromised, the security of multiple sessions (instead of just a single session) is hurt. Further, management of the session keys in this mode resides with the user device that initiates a session, rather than the trusted authority.

C. Generalized Techniques for Secure Multi-Party Communication with QKD

Figure 13:
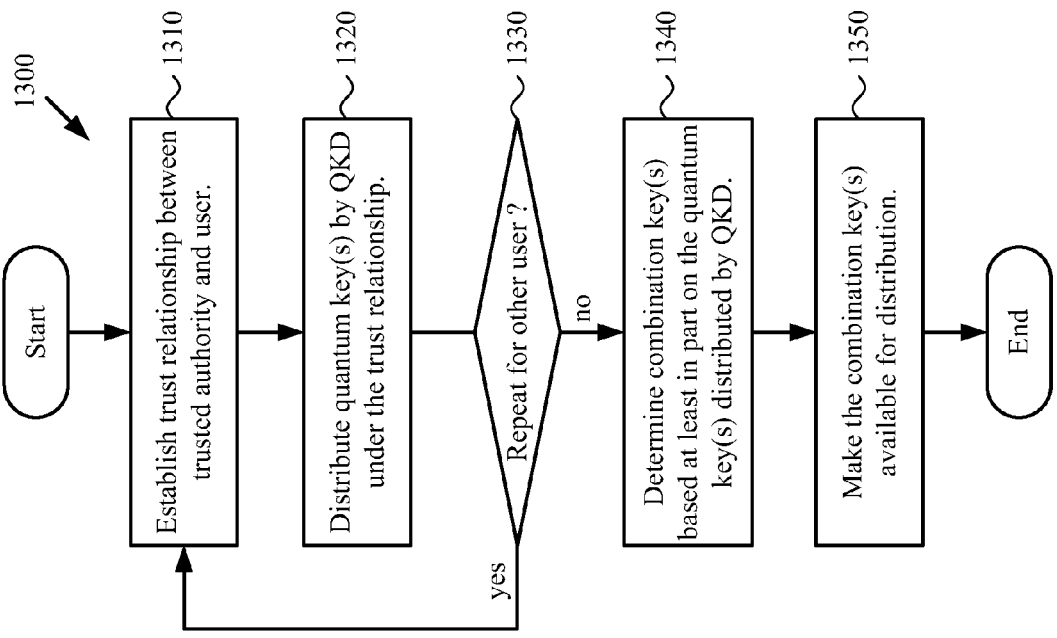
FIG. 13 is a flowchart illustrating a generalized technique for key distribution including QKD between a trusted authority and one or more user devices for secure multi-party communication.

FIG. 13 shows a generalized technique (1300) for key distribution between a trusted authority and one or more user devices to distribute keys for secure multi-party communication. A computing system that implements a trusted authority performs the technique (1300).

The trusted authority establishes (1310) a trust relationship between the trusted authority and a user. For example, the trusted authority authenticates the user using biometric indicia and/or personal identification information (e.g., a PIN) provided by the user to establish the trust relationship. In some implementations, the biometric indicia and/or personal identification information are encrypted before transmission to the trusted authority over a public channel. The encryption uses a previously placed secret key, which can be replaced with another secret key from the results of QKD, for use in authentication before a subsequent QKD session. Alternatively, the trusted authority establishes the trust relationship using another mechanism.

After the trust relationship is established, the trusted authority distributes (1320) one or more quantum keys by QKD under the trust relationship between the trusted authority and user. In this QKD, the quantum key(s) can be directly provided to a user device of the user. Or, the quantum key(s) can be provided to a fillgun device that subsequently provides the quantum key(s) to a user device of the user. Quantum keys distributed by QKD are randomly generated and, therefore, assumed to be different from user to user. Each quantum key is, in literal terms, a series of binary values. The definitions of the quantum keys depend on the scenario in which the quantum keys are used. Example scenarios are discussed below.

The trusted authority (1330) determines whether to repeat these acts for QKD for another user and, if so, continues by establishing (1310) a trust relationship with another user. In this way, the trusted authority distributes different quantum keys for use by users (user devices) in secure multi-party communication.

Subsequently, the trusted authority determines (1340) one or more combination keys based at least in part on the quantum keys distributed by the trusted authority. In particular, the trusted authority determines a combination key from a quantum key distributed for a first user (first user device) and a quantum key distributed for a second user (second user device), where the combination key is adapted for communication between the first user device and the second user device. For example, the first user device can use the combination key, in combination with the quantum key distributed for the first user device, to determine the quantum key distributed for the second user device. A combination key is, in literal terms, a series of binary values. The definition of the combination key depends on the scenario in which the combination key is generated and used. Example scenarios are discussed below.

The trusted authority makes the combination key(s) available (1350) for distribution to the user devices. In this way, the trusted authority facilitates secure communication between the respective users, even in the absence of QKD directly between the user devices. The ways that combination keys are organized and delivered depends on implementation. For example, the combination keys are organized as a look-up table that is made available for non-secret distribution over the Web or another public channel. Or, even though the combination keys need not be kept secret, some or all of the combination keys are provided to the respective user devices over a non-public channel. Alternatively, the combination keys are organized and/or delivered using another mechanism.

In some scenarios, a quantum key for a first user (first user device) is a key derivation key, and a quantum key for a second user (second user device) is an encryption key for the second user device. For example, in terms of the example protocols explained with reference to FIG. 11, the key derivation key is a key L(1,2) for user device 1, and the encryption key is a key K(2,1) for user device 2. The combination key is a pair key P(1,2) computed as the bitwise XOR of L(1,2) and K(2,1). Alternatively, the combination key is determined using another mechanism. In general, for any two user devices, the role of the user device having the encryption key and the user device having the key derivation key can be switched to change which user device derives the encryption key of the other.

In other scenarios, the quantum keys for a first user (first user device) include a first key derivation key and an encryption key for the first device. The quantum keys for a second user (second user device) include a second key derivation key and an encryption key for the second user device. The trusted authority determines a first combination key from the first key derivation key and the encryption key for the second user device, and it determines a second combination key from the second key derivation key and the encryption key for the first device. For example, in terms of the example protocols explained with reference to FIG. 11, the first quantum keys include L(1,2) and K(1,2) for user device 1, and second quantum keys include L(2,1) and K(2,1) for user device 2. Pair key P(1,2) is the bitwise XOR of L(1,2) and K(2,1), and pair key P(2,1) is the bitwise XOR of L(2,1) and K(1,2). Alternatively, combination keys are determined using another mechanism. Thereafter, the first user device can determine the encryption key of the second user device from the first combination key and first key derivation key. Similarly, the second user device can determine the encryption key of the first user device from the second combination key and second key derivation key.

In any of these scenarios, the number of quantum keys distributed can be increased to accommodate communication with more users and user devices. The trusted authority can update the combination keys when more users are added to the network. The trusted authority can resupply users with new quantum keys as needed, updating combination keys accordingly.

In addition to determining and distributing combination keys, the trusted authority can distribute key authentication keys and key authentication values for authentication of user devices. For example, the quantum keys distributed for a user include a key authentication key for the user (user device). In terms of the example protocols explained with reference to FIG. 11, M(1) is an example of a key authentication key in the quantum keys for user device 1, and M(2) is an example of a key authentication key in the quantum keys for user device 2. The trusted authority creates one or more key authentication values that are made available for distribution. For example, the trusted authority determines a key authentication value using a cryptographic hash function of a key authentication key for one user device and an encryption key for another user device. Alternatively, the key authentication value is created using another mechanism. Thereafter, the first user device can use its key authentication key and the key authentication value to check the value of an encryption key it has derived for the other user device.

Figure 14:
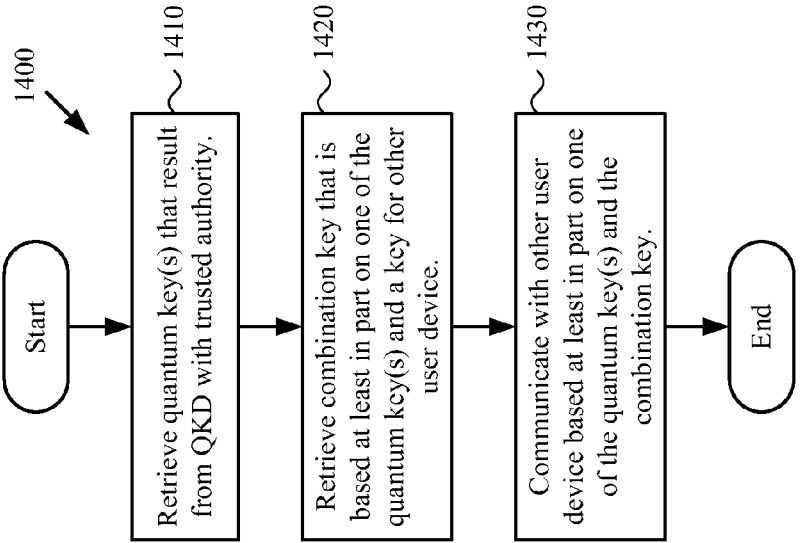
FIG. 14 is a flowchart illustrating a generalized technique for secure multi-party communication between user devices.

FIG. 14 shows a generalized technique (1400) for secure multi-party communication between multiple user devices. A first user device retrieves (1410) one or more quantum keys that resulted from QKD with a trusted authority under a trust relationship between the trusted authority and a user. For example, the first user device retrieves the quantum key(s) from secure memory or storage of the first user device. In some implementations, the quantum key(s) result from QKD between the trusted authority and the first user device itself. In other implementations, the quantum key(s) result from QKD between the trusted authority and a fillgun device, which subsequently provides the quantum key(s) to the first user device. The definitions of the quantum keys depend on the scenario in which the quantum keys are used. Example scenarios are discussed below.

Before QKD, a user device can provide information to the trusted authority to authenticate the user. For example, the user device receives biometric indicia and/or personal identification information (e.g., a PIN) provided by the user, encrypts the received material, and transmits the encrypted material to the trusted authority over a public channel. The encryption can use a previously placed secret key, which the user device replaces with another secret key from the results of QKD, for use in authentication before a subsequent QKD session. Alternatively, the user device uses another mechanism to establish a trust relationship with the trusted authority. In any case, the authentication and QKD can be completed long before a user device performs the technique (1400) for secure communication.

Returning to FIG. 14, the first user device also retrieves (1420) a combination key that is based at least in part on a retrieved quantum key and a key for another user device. For example, the first user device retrieves the combination key from storage of the user device or from a network resource over the Web or another public channel. The combination key can be provided from the trusted authority and stored at the first user device, or requested from an online trusted authority before communication. The ways that combination keys are organized and delivered depends on implementation, as explained above with reference to FIG. 13. The definition of the combination key depends on the scenario in which the combination key is generated and used. Example scenarios are discussed below.

The first user device then communicates (1430) with the other user device based at least in part on the retrieved quantum key(s) and the combination key. In particular, the first user device derives the key of the other user device from the combination key and a retrieved quantum key, then uses the key of the other user device. The combination key thus facilitates secure communication between the two user devices even in the absence of QKD between the two user devices.

In some scenarios, a retrieved quantum key for the first user device is a key derivation key, and the first user device determines the key for the other device using the key derivation key and the combination key. For example, in terms of the example protocols explained with reference to FIGS. 12a and 12b, user device 1 determines an encryption key K(2,1) for user device 2 as the bitwise XOR of the key derivation key L(1,2) and the pair key P(1,2). Alternatively, the first user device determines the key for the other device using another mechanism.

Having determined the key of the other user device, the first user device can generate a random session key, encrypt the session key using the determined key, and transmit the encrypted session key to the other user device. The other user device decrypts the session key, and the two user devices exchange messages encrypted using the session key. Alternatively, the other user device generates the session key, encrypts the session key using its key, and provides the encrypted session key to the first user device, which decrypts the session key using the derived key of the other user device. In general, for any two user devices, the role of the user device having the key derivation key and the other user device can be switched to change which user device derives the encryption key of the other user device.

In other scenarios, the quantum keys retrieved by the first user device include a key derivation key and an encryption key. In fact, each of the two user devices retrieves its own key derivation key and its own encryption key, then determines the encryption key of the other user device from the retrieved key derivation key and a combination key. Having determined the encryption key of the other user device in this way, each user device uses one of the two encryption keys to encrypt outbound messages to the other user device, and uses the other encryption key to decrypt inbound messages from the other user device.

In still other scenarios, the quantum keys retrieved by the first user device include a different key for each of multiple other user devices. The first user device determines a group session key, encrypts the group session key, and distributes the encrypted group session key to each of the other user devices. The following section describes example protocols for distribution of group session keys.

In some implementations, the quantum keys retrieved by the first user device also include a key authentication key. To authenticate the derived key of the other user device, the first user device retrieves a key authentication value made available by the trusted authority, which will be used for reference. The first user device determines its own version of the key authentication value from its key authentication key and the derived key of the other user device. For example, the first user device determines the key authentication value using a cryptographic hash function. Alternatively, the first user device determines the key authentication value using another mechanism. The first user device then compares the retrieved reference value to the newly determined value, to check that the values match.

D. Example Protocols for Group Keying

In some implementations, the above-described protocols for secure multi-party communication are extended to allow a group of users to establish a group session key using logical key hierarchy principles. For a group of N user devices, each of the N user devices gets keys from QKD with a trusted authority. One of the N user devices is designated group leader. The group leader generates a group key and derives the encryption key $K(j,i)$ for each other member of the group (or, alternatively, uses its encryption key $K(i,j)$ for the other member of the group). For each other member of the group, the group leader encrypts the group key using the appropriate encryption key and sends the encrypted group key to the other member. The other member decrypts the group key using its encryption key $K(j,i)$ (or, alternatively, derives and uses the encryption key $K(i,j)$ of the group leader). The members of the group then use the group key as a shared session key to encrypt and decrypt messages for secure communication within the group.

For example, suppose the group has ten members $I_1$ to $I_{10}$ that have each performed QKD with a trusted authority. To establish a common group key, one of the members (e.g., $I_{10}$) is designated group leader. The group leader $I_{10}$ generates a group key and derives the encryption keys $K(j,I_{10})$ for the other members of the group. The group leader encrypts the group key using the encryption keys for the other devices, respectively, and sends the encrypted versions of the group key to the other devices, which decrypt the group key for use in secure communication within the group.

For secure pair-wise communication between an individual group member and the group leader, the group leader can generate individual keys, one for each group member other than the leader. The group leader can encrypt these individual keys with the appropriate encryption keys $K(j,i)$ (or, alternatively, $K(i,j)$) and deliver them to the other members along with the encrypted group key.

To simplify the process of distributing a new group key when a member leaves the group, the group leader can further divide the group members into sub-groups, generate sub-group keys for the respective sub-groups, and encrypt the appropriate sub-group key for delivery to each of the other members. For example, the group leader I.sub.10 divides the remaining members I.sub.1 to I.sub.9 into three sub-groups: SG1={$I_1, I_2, I_3$}, SG2={$I_4, I_5, I_6$} and SG3={$I_7,$ $I_8, I_9$}. The group leader $I_{10}$ generates three sub-group keys. For each of the other members, the group leader $I_{10}$ selects the appropriate sub-group key for the sub-group that includes the other member j, encrypts the sub-group key with the appropriate encryption key $K(j, I_{10})$ for the member j (or, alternatively, the key $K(I_{10},j)$), and delivers the encrypted sub-group key to the member j along with the group key or separately. The sub-group keys can also be used for communications within a sub-group that are secure relative to other sub-groups.

If member $I_1$ leaves the group, the remaining members get a new group key. Members $I_2$ and $I_3$ form a new sub-group SG1' and also get a new sub-group key. The group leader $I_{10}$ generates the new group key and generates the new sub-group key for the new sub-group SG1'. The group leader $I_{10}$ encrypts and sends the new group key and new sub-group key to each member of sub-group SG1', using the individual key appropriate for member $I_2$ and member $I_3$, respectively. The group leader $I_{10}$ also encrypts and sends the new group key to each member of sub-group SG2 and each member of sub-group SG3. For this, the group leader $I_{10}$ can use the individual key appropriate for the respective members $I_4$ to $I_9$ or use the appropriate sub-group key for SG2 or SG3. Alternatively, the group leader $I_{10}$ can provide the new group key to one member of each unchanged sub-group, who then conveys the new group key to other members of the sub-group using the sub-group key for encryption. By providing each user with three keys, the process of providing a new group key after departure of a group member can be accomplished more efficiently than sending a new group key to each user separately. After the new group and sub-group keys are in use, the former member $I_1$ is unable to participate in secure group and sub-group communications.

More elaborate variations of group re-keying involve more users and/or more layers of intermediate sub-grouping. For such variations, for example, the logical key hierarchy can be organized as nodes of a tree structure.

E. Performance Evaluation and Advantages of Protocols

Consider a scenario in which the trusted authority is expected to be off-line during secure communication between user devices. If there are a thousand user devices (N=1000), each user device i stores N−1 encryption keys $K(i,j)$, N−1 key derivation keys $L(i,j)$, N−1 pair keys $P(i,j)$, and N−1 key authentication values $A(i,j)$ as well as a key authorization key $M(i)$ and fresh authorization key $AK_x(i)$. If the keys and authentication values each have a length of 256 bits, the total requirements for memory are $((4\times999)+2)\times 256=1023488$ bits, or roughly 1 Mbit. A key or authentication value for a given user device j can be specified with 10 bits, since N<1024. The amount of quantum key material each user generates with the trusted authority for $K(i,j)$ and $L(i,j)$ is approximately 500 kbits. In a QKD system operating at a 10 MHz clock rate with secret bit rates ~1 kbps, distributing the keys $K(i,j)$ and $L(i,j)$ takes about 500 seconds of QC (about 8 minutes) for each user.

The above-described secure multi-party communication after QKD offers several improvements over conventional protocols for secure multi-party communication.

By using a short-term pre-placed authentication key $AK(i)$ and renewing the authentication key $AK(i)$ in QKD, the window of opportunity for an adversary to break a given authentication key $AK(i)$ is reduced.

Public key cryptography is not required. Instead, QKD provides for generation of shared random numbers with forward security. Notably, the encryption keys K(i,j) and key derivation keys L(i,j) have forward security—they are not derived algorithmically from pre-placed keys shared with trusted authority. QKD thus provides superior forward security assurances and flexible key replacement without the archival attack concerns of existing approaches. Through the use of fillguns that store and disseminate keys from QKD, the protocol extends the advantages of QC (forward secrecy, and immunity to archival attacks) to users who have no direct quantum link. Secret session keys that are randomly generated and encrypted with encryption keys K(i,j) also have forward security.

A dishonest or compromised user (or coalition of such users) cannot compromise the communications between other users. Instead, the communications between the other users rely on different encryption keys and key derivation keys specific to those other users.

The trusted authority can be online during a communication session between users, but can also be off-line. In general, the trusted authority need not be online after relevant elements of the pair keys P(i,j) and key authentication values A(i,j) have been distributed to users.

The pair keys P(i,j) and key authentication values A(i,j) can be provided over a non-secure network such as a public network. Without knowledge of the encryption keys K(i,j) and key derivation keys L(i,j), the pair keys P(i,j) are useless for deciphering the communications secured by the encryption keys K(i,j).

The secure multi-party communication protocols with QKD can be used in diverse scenarios, including scenarios with a satellite-based trusted authority supporting global secure communications between coalitions of land, sea and air-based users. The protocols can also be used in scenarios in which the trusted authority is a QC node in a transparent optical network such as an optical access network, or an enterprise or metro-area network. In scenarios in which QC cards acquire keys through QKD with a trusted authority, the protocols support the use of QC cards for access control, secure telephone calls, key delivery or other purposes.

The secure multi-party communication protocols can be extended with group keying to support secure teleconferencing among a large group of users. More generally, the secure multi-party communication protocols provide the ability to create an ad hoc secure group of users with group keying.

F. Example Password-Based Authentication Using a QIP

Password-based authentication using a quantum identification protocol ("QIP") can be performed between a given user device and trusted authority before beginning one of the above-described QKD protocols. For example, password-based authentication using a QIP is used to generate an initial authentication key (instead of using a pre-placed authentication key), and then one of the above-described QKD protocols is used to perform QKD between the trusted authority and user device to establish keys for secure multi-party communication or another purpose.

In password-based authentication using a QIP, a password w(i) for a user i is shared with the trusted authority. Different users have different passwords. The trusted authority stores the different passwords for the respective users in secure memory in the system that implements the trusted authority. The password w(i) is used for authentication between the trusted authority and a user i, but the password w(i) is not itself communicated between the user i and trusted authority, even in encrypted form. As such, information about the password w(i) is not revealed according to the QIP, and the password may be used multiple times without compromising security.

The constituent parts of a password w(i) depend on implementation. For example, a password w(i) can include: (1) a part that is input by the user i and is relatively easy for the user to memorize (such as a series of 8 to 12 alphanumeric characters or special ASCII characters on a conventional keyboard), (2) a part that is stored in secure memory on the user device (such as a longer string of random bits defining a high entropy key), and/or (3) a part that represents a digest of biometric indicia (such as fingerprint scan data) provided by the user i. Alternatively, the password w has other and/or additional parts.

For authentication between the user i and trusted authority, the password w(i) is used within a QIP to convince the trusted authority that the user is not an imposter, and to prevent an honest user from establishing quantum keys with a fake trusted authority. If a fake trusted authority cannot impersonate a real trusted authority, the fake trusted authority cannot convince an authorized user to perform QKD with the fake trusted authority. For example, as part of the QIP:

- a user device for user i generates a string of random bits, encodes the bits as quantum states according to randomly assigned bases (e.g., rectilinear or diagonal), and transmits (via quantum channel) such quantum state information to the trusted authority;
- the trusted authority receives the quantum state information and measures quantum states according to a pattern of bases that depends on the password w(i) (e.g., using a pattern of rectilinear/diagonal measuring bases selected as a function of the password w(i));
- the user device i selects a first hash function to be applied to shared secret bits from the QIP, and the user device transmits (via conventional channel) an indication of the first hash function to the trusted authority along with the pattern of sending bases it used in quantum transmission;
- the user device i and trusted authority each determine shared secret bits for the QIP as those bits for which sending basis matched measuring basis (the user device itself determines the pattern of measuring bases from the password w(i));
- the trusted authority selects a second hash function to be applied to the password w(i), and the trusted authority transmits (via conventional channel) an indication of the second hash function to the user device i along with a message authentication code that depends on part (e.g., high entropy key) of the password w(i);
- the user device i authenticates the trusted authority based on the message authentication code and its stored version of the part (e.g., high entropy key) of the password w(i);
- the user device i computes a check value based on (a) application of the first hash function to its version of the shared secret bits and (b) application of the second hash function to the password w(i), and the user device transmits (via conventional channel) the check value to the trusted authority; and
- the trusted authority computes its own version of the check value and compares it to the check value received from the user device i, so as to authenticate the user device.

For additional details about variations of QIPs, see, e.g., Damgard et al., "Secure Identification and QKD in the Bounded-Quantum-Storage Model," Crypto 2007, Lecture Notices Computer Science 4622, pages 342-359 (2007).

In the QIP, the string of secret bits determined by the user device i will match the string of secret bits determined by the trusted authority only if the trusted authority has the password w(i) and the user device has the password w(i). Otherwise, the pattern of measuring bases determined at the trusted authority will not match the pattern of measuring basis determined at the user device i. Moreover, without betraying details of the password w(i), the QIP allows the trusted authority to verify the user's identity and convinces the user that the trusted authority is legitimate.

The secret random bits that result from the QIP can be used to generate an initial authentication key $AK_0$ to use for authentication of the user when establishing quantum keys with the trusted authority. The secret bits that result from the QIP are shared by the user device and trusted authority. Some or all of the secret bits can be directly used to form the key $AK_0$, or some or all of the secret bits can be hashed to form the key $AK_0$. The user device and trusted authority then use the key $AK_0$ to initiate QKD to establish keys for secure multi-party communication or another purpose according to one of the above-described QKD protocols. One of the keys established in QKD can be used to update part of the password w(i) (e.g., to replace the high entropy key in secure memory at the user device and trusted authority) instead of updating the key $AK_0$. Or, the same password w(i) can simply be reused for future authentication. Alternatively, password-based authentication using a QIP is itself used to establish a trust relationship between the trusted authority and given user (instead of later authentication using an initial authentication key $AK_0$).

Password-based authentication using a QIP can provide security in the event of loss of a user device. Without the part of a password that a user provides as input (or without the biometric indicia that the user provides as input), a non-authorized user cannot convince the trusted authority to accept him as the authorized user of the device, and the non-authorized user is unable to use the device to perform QKD with the trusted authority.

G. Example Hierarchy of Trusted Authorities

In the above-described QKD protocols, a trusted authority establishes keys by QKD with each of multiple users. A trusted authority can be part of a hierarchy of trusted authorities, in which case the trusted authority establishes keys with a sub-network of one or more users. Users associated with different trusted authorities can establish shared secret keys through an intermediary trusted authority in the hierarchy.

For example, a hierarchy includes two child trusted authorities and a parent trusted authority that acts as an intermediary. The first child trusted authority is associated with one or more users in a first sub-network. In particular, the first child trusted authority distributes keys by QKD under a trust relationship with a first user in the first sub-network. The second child trusted authority is associated with one or more users in a second sub-network. In particular, the second child trusted authority distributes keys by QKD under a trust relationship with a second user in the second sub-network.

The first child trusted authority is also operable to engage in QKD with the parent trusted authority. (And the second child trusted authority is operable to engage in QKD with the parent trusted authority.) The first child trusted authority retrieves keys that result from QKD with the parent trusted authority, and the first child trusted authority uses one of the keys from QKD with the parent trusted authority (and one of the keys from QKD with the first user) to facilitate secure communication between the first user and second user.

For example, the first child trusted authority receives an encrypted session key from the parent trusted authority and decrypts the encrypted session key using one of its keys from QKD with the parent trusted authority. The first child trusted authority re-encrypts the session key using one of its keys from QKD with the first user, and distributes the re-encrypted session key to the first user device. Similarly, the second child trusted authority receives an encrypted version of the session key from the parent trusted authority, decrypts the encrypted session key using one of its keys from QKD with the parent trusted authority, re-encrypts the session key using one of its keys from QKD with the second user, and distributes the re-encrypted session key to the second user device. Each of the first and second user devices decrypts the encrypted session key using its key from QKD with its trusted authority, then uses the session key for secure communication or another purpose. More generally, following one of the above-described group keying protocols, the parent trusted authority can operate as a group leader, with each of the child trusted authorities operating as a sub-group leader. In this configuration, the respective trusted authorities are separate physical nodes that perform QKD with other nodes and user devices, not just separate logical nodes.

Alternatively, instead of using keys established by QKD to share session keys, a child trusted authority uses combination keys together with keys established by QKD to facilitate secure communication between users. For example, a first child trusted authority retrieves an authority-to-authority combination key that is distributed by the parent trusted authority. The authority-to-authority combination key (as a pair key) is based on one of the keys from QKD between the first child trusted authority and the parent trusted authority, and it is also based on a key from QKD between the second child trusted authority and the parent trusted authority. The first child trusted authority uses the authority-to-authority combination key (as a pair key) and its key from QKD with the parent trusted authority to derive the key for the second child trusted authority. The first child trusted authority then communicates with the second child trusted authority to determine a user-to-user combination key. The user-to-user combination key (as a pair key) is based on one of the keys from QKD with the first user and is also based on one of the keys for the second user (from QKD between the second user and second child trusted authority). The first child trusted authority makes the user-to-user combination key available for distribution to the first user device, which can use the user-to-user combination key and its key from QKD with the first child trusted authority to determine the key for the second user device.

In the preceding examples, one parent trusted authority is an intermediary between two child trusted authorities in a hierarchy. Alternatively, the hierarchy includes more trusted authorities at a given level and/or more levels of trusted authorities.

H. Example Distributed Trusted Authority Functions

A computing system implements the role of a trusted authority, and the computing system can be located at a single physical location or distributed among multiple physical locations. The above-described QKD protocols can be implemented in a configuration in which the functions of a trusted authority are distributed across multiple physical nodes. Distribution of trusted authority functions across multiple physical nodes can help protect against failure or compromise of any given one of the nodes.

If the functions of a trusted authority are associated with a single physical node, the single node constitutes a single point of potential failure or compromise. To mitigate this risk, quantum secret sharing can be used to distribute the functions of a trusted authority across two or more physical nodes. Instead of QKD between a user device and single physical node for the trusted authority, the user device performs quantum secret sharing with the multiple physical nodes constituting the trusted authority. For example, a first user device uses quantum secret sharing to facilitate first QKD for a first user and the multiple physical nodes of the trusted authority; and a second user device uses quantum secret sharing to facilitate second QKD for a second user and the multiple physical nodes of the trusted authority. For details about variations of quantum secret sharing, see, e.g., Hillery et al., "Quantum Secret Sharing," Physical Review A, vol. 59, no. 3, pages 1829-1834 (1999). In this way, loss or compromise of any single physical node of the trusted authority does not prevent or compromise key establishment between users.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A method of a trusted authority facilitating secure, authenticated communication between a first user device and a second user device, the method comprising:
providing a secret key derivation key and a secret key authentication key to the first user device, by a first quantum key distribution;
providing a secret encryption key to the second user device, by a second quantum key distribution;
calculating a pair key based at least in part on the secret key derivation key and the secret encryption key;
calculating, using a cryptographic one-way function, a key authentication value based at least in part on the secret key authentication key and the secret encryption key; and
making the pair key and the key authentication value available for distribution.

2. The method of claim 1, wherein the pair key and the key authentication value are made available for distribution over a public channel.

3. A method of a trusted authority facilitating secure, authenticated communication among n user devices $D_1$, $D_2$, ..., $D_n$, the method comprising:
for each pair of user devices $D_i$ and $D_j$:
providing, to user device $D_i$, a secret key derivation key $L(i,j)$ and a secret key authentication key $M(i)$ by a first quantum key distribution;
providing, to user device $D_j$, a secret encryption key $K(j,i)$ by a second quantum key distribution;
calculating a pair key $P(i,j)$ based at least in part on secret key derivation key $L(i,j)$ and secret encryption key $K(j,i)$;
calculating, using a cryptographic one-way function, a key authentication value $A(i,j)$ based at least in part on secret key authentication key $M(i)$ and secret encryption key $K(j,i)$; and
making pair key $P(i,j)$ and key authentication value $A(i,j)$ available for distribution, wherein pair key $P(i,j)$ and key authentication value $A(i,j)$ allow user device $D_j$ to derive and authenticate secret encryption key $K(j,i)$.

4. The method of claim 3, further comprising:
for each pair of user devices $D_i$ and $D_j$:
providing, by the first quantum key distribution to user device $D_i$, a secret encryption key $K(j,i)$, wherein $K(i,j)$ may be different from $K(j,i)$;
providing, by the second quantum key distribution to user device $D_j$, a secret key derivation key $L(j,i)$ and a secret key authentication key $M(j)$, wherein $L(j,i)$ is different from $L(i,j)$ and $M(j)$ is different from $M(i)$;
calculating a pair key $P(j,i)$ based at least in part on secret key derivation key $L(j,i)$ and secret encryption key $K(i,j)$;
calculating, using a cryptographic one-way function, a key authentication value $A(j,i)$ based at least in part on secret key authentication key $M(j)$ and secret encryption key $K(i,j)$; and
making pair key $P(j,i)$ and key authentication value $A(j,i)$ available for distribution, wherein pair key $P(j,i)$ and key authentication value $A(j,i)$ allow user device $D_j$ to derive and authenticate secret encryption key $K(i,j)$.

5. The method of claim 4, wherein n>2.

6. The method of claim 5, further comprising:
storing the pair keys corresponding to each pair of user devices in a lookup table; and
making the pair keys available for non-secret distribution over a public channel.

7. A method of facilitating secure, authenticated communication between a first user device and a second user device, the method comprising:
receiving, at the first user device, a secret key derivation key and a secret key authentication key, by a quantum key distribution;
receiving, at the first user device, a pair key;
receiving, at the first user device, a key authentication value that is based at least in part on the secret key authentication key;
calculating, using the pair key and the secret key derivation key, a target encryption key;
verifying, at the first user device, using the key authentication value, that the target encryption key corresponds to the second user device; and
encrypting, at the first user device, using the target encryption key, a message for the second user device.

8. The method of claim 7, further comprising:
receiving, at the first user device, a secret source encryption key;
receiving, at the first user device, an encrypted message from the second user device;
decrypting the encrypted message using the secret source encryption key.

9. A user device comprising a processor, memory and storage storing computer-executable instructions for causing the user device to perform a method of secure communication with a target device, the method comprising:
receiving, at the user device, a secret key derivation key and a secret key authentication key, by a quantum key distribution;
receiving, at the user device, a pair key;

receiving, at the user device, a key authentication value;
calculating, using the pair key and the secret key derivation key, a target encryption key;
verifying, using the key authentication value, that the target encryption key corresponds to the target device; and
encrypting, using the target encryption key, a message for the target user device.

10. The device of claim 9, wherein the method of secure communication with a target device further comprises:
receiving a secret source encryption key;
receiving an encrypted message from the target user device;
decrypting the encrypted message using the secret source encryption key.

* * * * *